US006380935B1

(12) United States Patent
Heeschen et al.

(10) Patent No.: US 6,380,935 B1
(45) Date of Patent: Apr. 30, 2002

(54) CIRCUIT AND METHOD FOR PROCESSING RENDER COMMANDS IN A TILE-BASED GRAPHICS SYSTEM

(75) Inventors: Scott C. Heeschen, Campbell; Ming Benjamin Zhu, San Jose, both of CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 09/271,613

(22) Filed: Mar. 17, 1999

(51) Int. Cl.$^7$ .............................................. G06T 15/00
(52) U.S. Cl. ...................................................... 345/423
(58) Field of Search ................................. 345/419, 420, 345/423, 619, 620, 621, 622, 623, 624

(56) References Cited

U.S. PATENT DOCUMENTS

| | | | |
|---|---|---|---|
| 5,404,431 A | * 4/1995 | Kumazaki et al. .......... | 395/143 |
| 5,706,481 A | * 1/1998 | Hannah et al. ............. | 395/519 |
| 6,100,906 A | 8/2000 | Asaro et al. ................ | 345/508 |
| 6,195,737 B1 | 2/2001 | Hollister et al. ............ | 711/220 |
| 6,208,354 B1 | 3/2001 | Porter ......................... | 345/435 |
| 6,249,288 B1 | 6/2001 | Campbell ................... | 345/435 |
| 6,279,080 B1 | 8/2001 | DeRoo ........................ | 711/135 |
| 6,297,832 B1 | 10/2001 | Mizuyabu et al. .......... | 345/540 |

OTHER PUBLICATIONS

OpenGL Architecture Review Board, "OpenGL Programming Guide, Second Edition" *Addison–Wesley*, pp. 27–55, Jan., 1997.

OpenGL Architecture Review Board, "OpenGL Reference Manual" *Addison–Wesley*, Table of Contents, 1992.

Rob Glidden, "Graphics Programming with Direct3D, Techniques and Concepts", *Addison–Wesley*, Table of Contents, 1997.

* cited by examiner

*Primary Examiner*—Phu K. Nguyen
(74) *Attorney, Agent, or Firm*—Townsend and Townsend and Crew LLP

(57) ABSTRACT

A method performed in a graphics processor associates at least a portion (e.g. a triangle) of each primitive received from a CPU with each tile that is affected by the primitive (e.g. by storing the triangle in one or more tile-specific buffers, also called simply "tile buffer"). Moreover, the method stores packets that contain commands (also called "render commands") for rendering the primitives (also called "command packets") in a common buffer (called "broadcast buffer"), thereby to eliminate storage of the same commands in each tile buffer. The method repeats the just-described acts of associating primitives and storing command packets for each of a number of packets of primitives and commands that are generated by an application program for the display of a single frame. At a later time, the method uses the command packets from the broadcast buffer with primitives (or portions thereof) in each tile buffer tile, e.g. in one embodiment renders an image. The same render commands that are held in the broadcast buffer are used repeatedly, once for each tile buffer.

27 Claims, 10 Drawing Sheets

US 6,380,935 B1

CIRCUIT AND METHOD FOR PROCESSING RENDER COMMANDS IN A TILE-BASED GRAPHICS SYSTEM

CROSS REFERENCE TO RELATED APPLICATIONS

This application is related to, and incorporates by reference herein in their entirety, the following commonly owned U. S. patent applications:

Ser. No. 08/978,491, filed by Ming Benjamin Zhu on Nov. 25 1997, entitled "Rendering Pipeline";

Ser. No. 09/271,026, filed concurrently herewith, by Ming Benjamin Zhu et al. entitled "A Circuit and Method For Deferring the Binding of Render States To Primitives In a Graphics System"; and Ser. No. 09/271,637, filed concurrently herewith, by Oana Baltaretu et al., entitled "A Method For Determining Tiles In A Computer Display That Are Covered By A Graphics Primitive".

CROSS REFERENCE TO MICROFICHE APPENDIX

Appendix A, which is part of the present disclosure, is included in a microfiche appendix consisting of 1 sheet of microfiche having a total of 31 frames, and the microfiche appendix is incorporated herein by reference in its entirety. Microfiche Appendix A is a listing of pseudo code for computer programs and related data that can be prepared in the language VERILOG for implementing circuitry including a synchronizer that receives and stores graphics data for the generation of a screen display, for use with one illustrative implementation of this invention as described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

A personal computer 10 (FIG. 1) includes a graphics processor 14 that generates a display of a three-dimensional (abbreviated as "3D") image on a screen 11 under the control of a central processing unit 15. Graphics processor 14 forms the displayed image 19 from graphics primitives describing the surfaces to be displayed (e.g. soda-can 17 and table 18), and the related render states (such as the soda-can texture and the table texture).

An image displayed on screen 11 is typically formed by colors of a two-dimensional array of picture elements (called "pixels"). The pixel colors are normally generated by an application program being executed by CPU 15 in terms of graphics primitives (e.g. triangles and strips) that define the boundaries of various surfaces in the image, and states (also called "render states", e.g. texture, culling, and fog) that define the appearance of the to-be-displayed surfaces (e.g. brick, fur etc). CPU 15 normally specifies each graphics primitive in terms of its vertices. Moreover, CPU 15 specifies each state as two parts: a token (containing a name, such as fog), and a value (such as "on").

A description (hereinafter "graphics API") of the format of such states, commands, and primitives is provided in a book entitled "Graphics Programming with Direct 3D Techniques and Concepts" by Rob Glidden, Addison-Wesley Developers Press, Reading, Mass., 1997. For additional information, see the books (1) "OpenGL Reference Manual, The Official Reference Document for OpenGL, Release 1," by OpenGL Architecture Review Board, Addison-Wesley Publishing Company, Reading, Mass., 1992 and (2) "OpenGL Programming Guide, Second Edition, The Official Guide to Learning OpenGL, Version 1.1," by OpenGL Architecture Review Board, Addison-Wesley Developers Press, Reading, Mass., 1997.

In an example using the just-described API, when an image of soda-can 17 on table 18 is to be displayed, an application program executed by CPU 15 specifies one or more render commands, for example a "background" command that sets background to a certain color. Such commands may be followed by one or more primitives for soda-can 17. Between a command and a primitive, the application program may specify one or more render states for soda-can 17, such as a "texture" state that indicates the memory address of a texture to be applied to a subsequent soda-can primitive to generate a display of soda-can 17. The graphics data (commands, render states, and primitives) that are generated by the application are normally processed by another program (called "graphics driver") that is executed by CPU 15.

In a tiled architecture, graphics processor 14 divides screen 11 into rectangular areas (called "tiles") T1–TN, and each tile TI contains a number of pixels (e.g. 16 pixels) that form a portion of the displayed image. Each tile TI is held and processed one at a time in an on-chip memory (not labeled) included in graphics processor 14 (FIG. 1). Tiles T1–TN can be of any rectangular shape, but typically might be 32 pixels high and 32 pixels wide. For a screen having 640×480 pixels, there may be 300 tiles arranged in a rectangle that is 20 tiles wide and 15 tiles high. As only one tile TI is held and processed at any time by graphics processor 14, a given record (of render states and commands) must be sent N times by CPU 15, once for each tile TI that is currently being processed.

SUMMARY OF THE INVENTION

In accordance with the invention, a method is performed in a computer graphics system (also called "graphics system") to temporarily store at least two kinds of graphics data (namely graphics primitives and render commands) in two kinds of buffers. Specifically, render commands (e.g. clearing of z-buffer, no-op indicating that no operation is to be performed in the current cycle, and setting of background color) are stored in a common buffer (also called "broadcast buffer") for later processing of the commands repetitively (once per tile, wherein the screen is subdivided into a number of tiles). The broadcast buffer is separate and distinct from a set of buffers (also called "tile buffers") that are also included in the graphics system, each tile buffer corresponding to a specific tile in the screen.

A graphics primitive (e.g. a triangle or a strip that defines the boundary of a surface in an image to be displayed on a screen of the graphics system) is stored in one or more of the tile buffer(s). The one or more primitive(s) stored in a tile buffer are used to generate colors for pixels in the corresponding tile, so that a display of all tiles displays the image on the screen. In one embodiment, the graphics primitive (or a portion thereof) is stored in only buffers for those tiles that are affected by the primitive, although in an alternative embodiment the graphics primitive may be stored in all tile buffers. Use of a broadcast buffer that is used to hold render commands for all tiles eliminates the need for redundant storage of the render commands in each tile buffer, and therefore reduces the memory otherwise required in the graphics system.

On storage of a render command and also on storage of a graphics primitive, a graphics processor included in the graphics system normally stores additional information, e.g. a switch command in the broadcast buffer, and a switch command in one or more tile buffers (depending on the implementation the switch command may be stored either prior to or subsequent to storage of a packet or portion thereof in the respective buffer). During retrieval, the graphics processor uses the stored additional information to establish an order among the render commands and the graphics primitives, e.g. so that the graphics processor retrieves the commands and primitives from the respective buffers in the same order as the order in which the graphics processor received the commands and primitives relative to one another.

During retrieval of graphics data in the above-described example, on encountering a switch command in either type of buffer, the graphics processor switches to retrieving graphics data from the other type of buffer. For example, on encountering a switch command in a tile buffer, the graphics processor switches to retrieving graphics data from the broadcast buffer, and vice versa (i.e. bounces back and forth in a "ping pong" fashion). In the example, the graphics processor switches between the tile buffer and the broadcast buffer until reaching the end of one of these buffers, and thereafter retrieves any remaining graphics data from the other of these buffers, ignoring any further switch commands. Therefore, on retrieval, the graphics data (e.g. commands) from the broadcast buffer is interleaved with graphics data (e.g. primitives) from a tile buffer, and the interleaved graphics data is processed further in the normal manner, e.g. in the rendering of pixels for a tile.

Specifically, in one embodiment, a binning engine included in the graphics processor stores one or more packet(s) each containing a render command in the broadcast buffer, stores one or more packet(s) each containing a primitive in the affected tile buffers, and also stores switch commands when graphics data that was received most recently is different from the graphics data that is currently received. Thereafter, render commands retrieved from the broadcast buffer are executed by a rendering pipeline (repeatedly if necessary, normally once for each tile in the frame). In one embodiment, the render commands are executed only after the frame is binned, i.e. after receipt of a primitive from a CPU (that is included in the graphics system and is coupled to the graphics processor), after one or more tiles that are affected by the received primitive are identified (e.g. by use of a bounding box around the primitive to identify tiles within the bounding box), and the primitive stored in the affected tile buffer(s).

The binning engine repeats the just-described acts (of storing command packets, receiving a primitive, and storing the received primitive in affected tiles' buffers) for each of a number of primitives that are generated by an application program in the CPU, for the display of a single frame. In this embodiment, the frame on which the binning engine operates is different from another frame (also called "previous frame") on which the rendering pipeline operates.

The rendering pipeline of this embodiment includes a retrieval engine that retrieves the primitives (one tile at a time), in sequence with respect to the previously-received and stored render commands (that are retrieved from the broadcast buffer). The retrieval engine repeatedly accesses the broadcast buffer and retrieves the same render commands, once for each tile in a frame. For each affected tile, the retrieval engine retrieves the render commands in sequence with the retrieval of primitives (i.e. in the same order in which the commands and the primitives were received from the CPU), and passes the in-sequence graphics data to other components included in the rendering pipeline.

The above-described switch commands (that allow retrieval of render commands from the broadcast buffer and of primitives from a tile buffer in the order received from the CPU) can be implemented in any of a number of ways. In one embodiment, the binning engine generates and stores, as the switch command, a sequence number (that may be a multi-bit number, such as a 24 bit number) in a buffer that is currently being used (such as the broadcast buffer or one of the tile buffers) each time that the type of graphics data (such as render command, or primitive) being received from the CPU changes. The binning engine changes the sequence number monotonically, e.g. on receipt of a graphics primitive or on receipt of a render command, so that a comparison of a sequence number retrieved from a tile buffer with another sequence number retrieved from the broadcast buffer indicates the order of receipt. In this embodiment, presence of the sequence number at a location in the tile buffer or the broadcast buffer indicates a change in the type of graphics data beyond that location (thereby indicating the need for switching between the two buffers). Storage of a switch command (such as a sequence number) only when the type of graphics data changes reduces the number of switch commands that are otherwise stored (e.g. on receipt of each render command and each graphics primitive).

In one implementation, the graphics data can be of a third kind, called "render state," and the graphics processor renders primitives differently depending on the value of each render state. Examples of render states include: fill mode (e.g. of value "solid"), light (e.g. of value "on"), and gouraud shading (e.g. of value "on"). In this implementation, the binning engine includes a synchronizer that performs a technique called "deferred render state binding," by receiving and storing the value of a render state that has changed (as indicated by a render state controller) for only those tiles that are affected by a subsequently received primitive (as indicated by a geometry tiler). The synchronizer stores the render states in one or more of the tile buffers (although render states may be stored in the broadcast buffer depending on the embodiment). Therefore, in one embodiment, a render state controller identifies from among all render states those states whose values have changed since their last association with an affected tile. Next, the synchronizer retrieves the changed render states, and stores in each affected tile's buffer the changed render states. In this embodiment, the retrieval engine retrieves the changed render states when retrieving primitives from the tile buffers.

DETAILED DESCRIPTION

Figure 1:
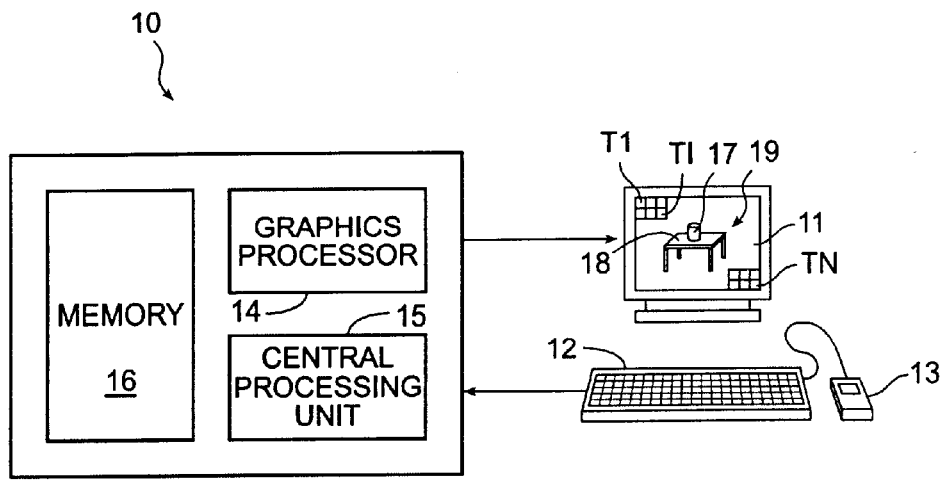
FIG. 1 illustrates, in a high level block diagram, a prior art computer graphics system.

A computer 200 (FIG. 2A) in accordance with this invention includes a circuit (hereinafter "binning engine") 240 that implements one or more acts of a method described herein, by storing in a broadcast buffer 236 one or more commands that are received from a central processing unit (CPU) 204, until after the identification of tiles 201A–201P (wherein A≦J≦P, P being the total number of identified tiles) on a computer's screen 11 that are affected by a graphics primitive, such as convex polygon 202 (that may be received from CPU 204 either after the commands, or before the commands depending on the embodiment).

Computer 200 can be, for example, a personal computer (PC), a graphics work station, or a game machine that includes a graphics processor 210. Commands in broadcast buffer 236 are used (e.g. executed) repeatedly, once for rendering primitives in each of tiles 201A–201P, and such use of a single buffer 236 for all tiles 201A–201P eliminates redundant storage of the same commands for every tile.

The (x, y) coordinates of the vertices of polygon 202, and related command(s) if any that are used in generating the colors for pixels on screen 11 are sent as packets by CPU 204 that operates under the direction of a graphics driver 220 that is held in memory 203 of computer 200. Specifically, CPU 204 generates packets that may contain a render command, or a primitive.

Figure 2B:
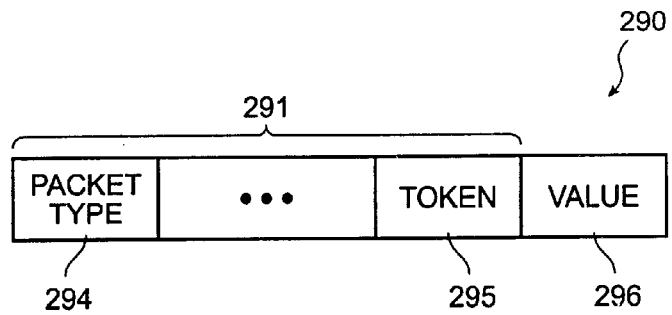
FIG. 2B illustrates the format of fields in a packet used by CPU 204 to transfer graphics data to graphics processor 210 of FIG. 2A.

In one embodiment, each packet 290 (FIG. 2B) includes at least the following two fields: a token field 295 (e.g. of 12 bits) indicating the specific name (or address) of render command, and a value field 296 (e.g. of 32 bits). Note that depending on the embodiment, packet 290 may have additional fields. In one example, packet 290 includes (in addition to fields 295 and 296) a type field 294 (e.g. of 1 bit) indicative of whether or not packet 290 contains a primitive. In another example, instead of field 294, a previous packet sent by CPU 204 has the token "begin_primitive" that indicates that one or more following packets contain primitives. Depending on the implementation, either a packet having the token "end_primitive", or a different value in type field 294 may indicate the end of the sequence of primitives.

Token field 295 holds a number that is selected from a set of predetermined numbers to indicate the identity of the render command being transmitted in packet 290 (e.g. the predetermined number 72 in token field 295 may indicate the "clear" command). Moreover, the value of a packet containing a render command may indicate the number of times the render command is to be performed (e.g. in case of a "no-op" command, a value 3 in field 296 indicates that nothing is to be done for 3 cycles).

Depending on the implementation, in addition to render commands, CPU 204 may send render states (in token field 295) and corresponding values (in field 296). In one such implementation, a number in the range 0–63 indicates one of 64 registers that are present in graphics processor 210, and that holds a value of a render state (such as texture, in which case value field 296 indicates a memory location at which the texture is present). In this example, a rendering pipeline 216 generates colors of pixels within polygon 202 based on the indicated texture.

Note that render states are not required to be handled or processed in any manner in order to practice the invention. Render states may be processed in any number of ways, although in one specific embodiment, the render states are processed as described herein. Note also that other than retrieval engine 216E, other components in the rendering pipeline are not critical aspects of the invention, and can be implemented in any number of ways. In one embodiment, such components are implemented as described in the U.S. patent application, Ser. No. 08/978,491, filed Nov. 25, 1997, entitled "Rendering Pipeline" incorporated by reference above.

As a significant aspect of the invention, graphics processor 210 does not immediately (on receipt) operate on a render command received from CPU 204, other than to store a packet containing the command in broadcast buffer 236. Depending on the embodiment, graphics processor 210 may also process render states in a manner similar to render commands, e.g. by storing render states in broadcast buffer 236, or alternatively in a tile buffer 231J that normally holds information specific to a tile 201J (such as primitives).

In one embodiment, binning engine 240 (FIG. 2A) stores all received commands in a broadcast buffer 236 until after tiles 201A–201P that are affected by a convex polygon (or a portion thereof) are identified. Binning engine 240 includes buffers 207 and 208 that temporarily hold the packets being received from CPU 204, for use by binning engine 240 and geometry tiler 212 respectively, both of which are included in binning engine 240. Binning engine 240 also includes an input interface (not labeled in FIG. 2A) that receives each packet from CPU 204 and stores the received packet in buffer 207 if the packet contains graphics data, and otherwise stores the packet (e.g. containing a render command) in buffer 208.

Geometry tiler 212 receives primitives from buffer 207 and identifies two or more types of tiles (e.g. edge tiles and interior tiles) that are covered by each visible polygon, as described in for example, the concurrently filed U.S. patent application, Ser. No. 09/271,637, entitled "A METHOD FOR DETERMINING TILES IN A COMPUTER DISPLAY THAT ARE COVERED BY A GRAPHICS PRIMITIVE" incorporated by reference above. Geometry tiler 212 identifies the tiles to synchronizer 213 in one or more sets, wherein each set includes a tile identifier and locations of vertices in geometry buffer 207, wherein a tile indicated by the tile identifier is covered by a primitive identified by the vertices.

Synchronizer 213 stores in graphics memory 230 one or more packets that are read out of buffer 208. Specifically, synchronizer 213 stores all packets containing render commands in broadcast buffer 236 for later use in rendering of each tile 201J by rendering pipeline 216. In one embodiment, synchronizer 213 also inserts in broadcast buffer 236 a switch command so that the render commands can be later retrieved in the order received with respect to primitives in a tile buffer 231J.

In one implementation, synchronizer 213 inserts the switch command only when the type of graphics data being received from the CPU changes (e.g. from commands to primitives). In an alternative implementation, synchronizer 213 inserts the switch command each time a render command is written to broadcast buffer 236, irrespective of the type of graphics data being received (and therefore requires more memory in buffer 236 than if the switch command is inserted only when the type of graphics data changes).

A retrieval engine 216E that is included in rendering pipeline 216 retrieves stored commands from broadcast buffer 236, and also retrieves primitives for a tile from a corresponding tile buffer 231J. Rendering pipeline 216 uses the render commands and primitives retrieved by engine 216E in the received order to render each primitive appropriately. Specifically, rendering pipeline 216 uses the render commands and the primitives to generate pixels for each tile 201J, and stores the pixels in a frame buffer memory 232 for later display in tile 201J on screen 11.

Note that depending on the implementation, graphics memory 230 (that includes binning memory 231 and frame buffer memory 232) can be merged into system memory 203 (FIG. 2A), and thus be accessible from CPU 204. Rendering pipeline 216, and related memory 216S as well as binning engine 240 are together included in one implementation in a single chip graphics processor 210. Graphics processor 210 with graphics memory 230 coupled thereto may be implemented as described in for example, the concurrently filed U.S. patent application, Ser. No. 09/271,636, incorporated by reference above. Note that various circuits, e.g. circuits 218 and 212 can be implemented differently in other embodiments, and are not critical aspects of such other embodiments.

As noted above, binning engine 240 uses a broadcast buffer 236 to hold one or more packet(s) being sent by CPU 204 (FIG. 2A) to graphics processor 210, until after a graphics primitive is received. Binning engine 240 stores the graphics primitive (or a portion thereof) in a tile-specific buffer (also called tile buffer) 231J. Depending on the embodiment, binning engine 240 may also use a next frame memory 213S to temporarily hold the values of render state changes that may be received from CPU 204 (FIG. 2A).

After identification of tiles that are affected by a received primitive (e.g. by geometry tiler 212 of FIG. 2A), and storing of one or more packets in broadcast buffer 236, retrieval engine 216E retrieves the packet(s) held in broadcast buffer 236. If a retrieved packet includes a render command, retrieval engine 216E passes the command to rendering pipeline 216 for execution. Depending on the implementation, if the packet includes a render state value, retrieval engine 216E updates a corresponding storage element in current frame memory 216S for later use by rendering pipeline 216 (with the primitive) in generating an image display across tiles 201A–201P (FIG. 2A).

Figure 2F:
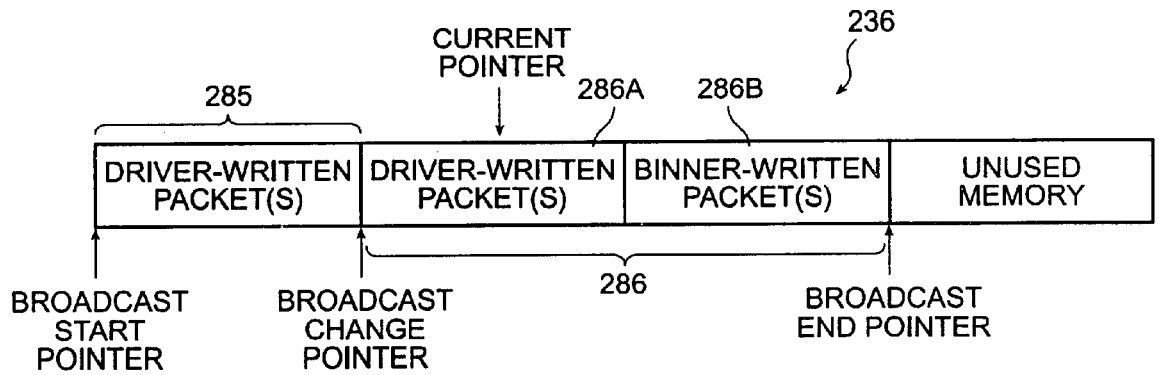
FIG. 2F illustrates use of the two broadcast buffer pointers (namely common start pointer, common change pointer, and common end pointer) to address packets in the broadcast buffer illustrated in FIG. 2A.
Figure 2A:
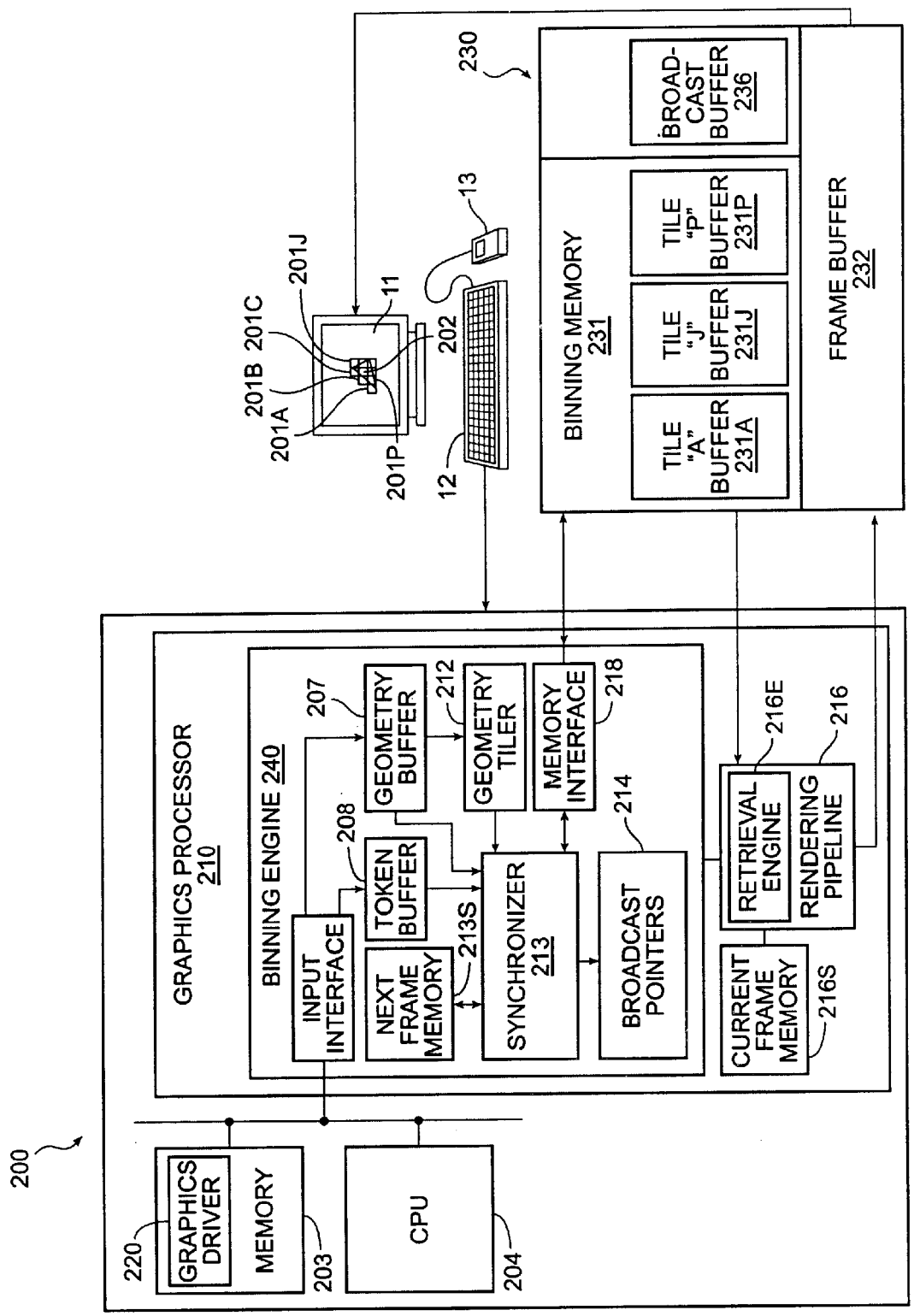
FIG. 2A illustrates, in a high-level block diagram, various components, such as a synchronizer, a rendering pipeline, a number of tile buffers and a broadcast buffer that are included in a computer graphics system in one embodiment of the invention.
Figure 2C:
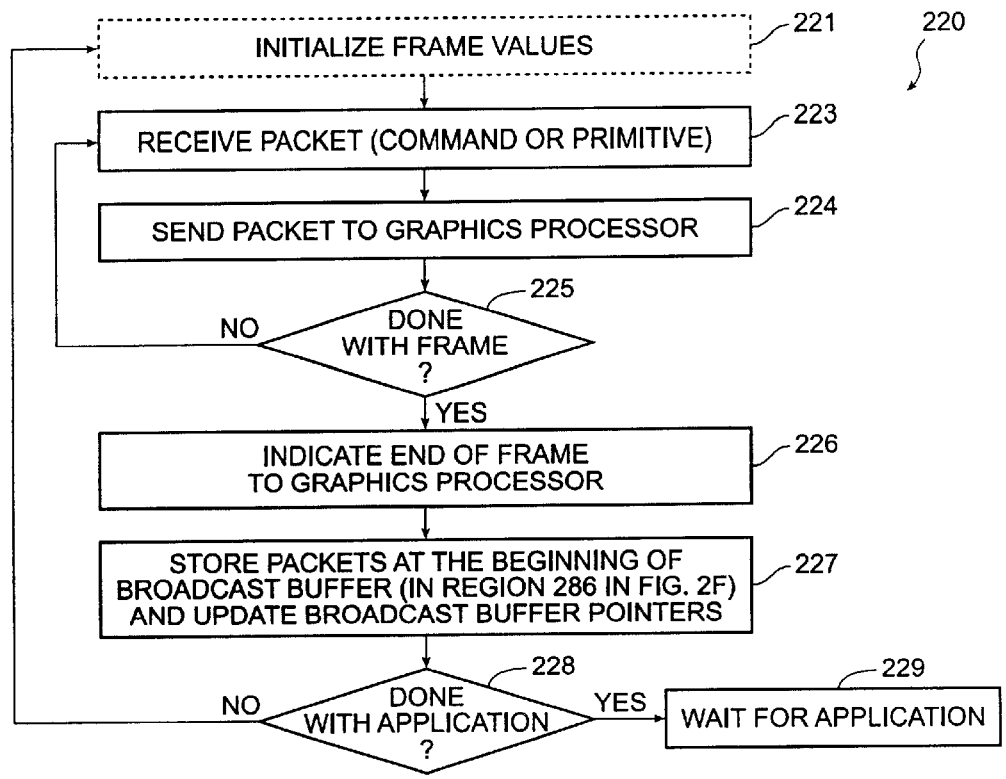
FIG. 2C illustrates, in a high-level flow chart, acts performed by CPU 204 of FIG. 2A when programmed with instructions of graphics driver 220 held in memory 203 of FIG. 2A.

In the embodiment illustrated in FIG. 2A, computer 200 includes, held in system memory 203, a graphics driver 220 that is executed by CPU 204 to send graphics data (in the form of packets, wherein each packet may contain a render command or a primitive) to graphics processor 210. Initially, at the beginning of supplying graphics data from an application, CPU 204 under the direction of graphics driver 220 (hereinafter simply "driver 220") initializes default values (see act 221 in FIG. 2C) that are specific to a frame, such as setting the address of frame buffer 235 to one of two buffers (not shown; commonly called "front buffer" and "back buffer") that are alternately used to supply the signals to screen 11, or setting default values for depth clear (also called "z-clear"). Note that depending on the implementation, other values may also be initialized in act 221, such as default values for render states.

Note that act 221 is an optional act for driver 220, and is not performed in one embodiment, e.g. because such acts are performed elsewhere—e.g. by synchronizer 213 (FIG. 2A) or by retrieval engine 216E. In one implementation of act 221, driver 220 writes packets that contain frame-specific default values (described in previous paragraph) into region 285 (FIG. 2F). At this time, driver 220 may also write packets containing default values that change during the rendering of a tile into region 286A (FIG. 2F). Thereafter, driver 220 processes packets that are written into region 286B as follows.

Specifically, in act 223 driver 220 receives packets (that may contain a render command or a primitive) from an application program, such as a video game (not shown in FIG. 2A), and sends (in act 224) the received packets to graphics processor 210 with minimal processing in CPU 204 (such minimal processing may include mapping of render commands that conform to the DIRECT 3D API into hardware-specific versions of these commands, or in case of primitives performing lighting, clipping, and transforming of vertices from a modeling space to the screen 11). Next, in act 225, driver 220 checks if all graphics data for displaying a frame (defined to be values of all pixels on screen 11) has been sent. If not, driver 220 returns to act 223 to send additional data, and if so, driver 220 determines that it is done with the current frame and goes to act 226.

Thereafter, driver 220 (see act 226) indicates an end of frame to graphics processor 210. Next, driver 220 (see act 227) directly writes (e.g. stores) additional packets in broadcast buffer 236 (FIG. 2F), before the broadcast start pointer and updates the broadcast start pointer. These additional packets are used at the beginning of processing a frame by rendering pipeline 216, and are effective for rendering primitives in each and every one of tiles 201A–201P. Examples of such packets include packets containing the render commands "clear" (meaning reset all storage elements in render store 216S illustrated in FIG. 2A), "no-op" (meaning just wait for the current cycle to be completed). Depending on the implementation, such packets may contain default values of render states, e.g. background set to blue color.

As noted above, at this time, driver 220 also updates the "broadcast start pointer" (FIG. 2F) in region 214 that points to the beginning of the queue in buffer 236. Driver 220 may also update a "broadcast change pointer" in region 214 (FIG. 2F) that points to packets that contain render states that may be changed after initialization (e.g. for a given tile, the background may be changed from blue at initialization to red), and that needs to be reinitialized for processing another tile. Next, driver 220 checks (in act 228 illustrated in FIG. 2C) if done with all graphics data generated by the application. If not, driver 220 returns to act 221 (described above), and if so driver 220 terminates execution for the current application. Next driver 220 waits (in act 229) for graphics data to be made available by another application program or next frame of the same application.

Therefore, graphics driver 220 (FIG. 2C) of this implementation is a "thin" application that merely includes computer instructions for performing acts 221–227 in conformance with the above-described graphics API. The "thin" nature of graphics driver 220 has several advantages as compared to the prior art. For example, the "thinness" reduces computing load on CPU 204, because less processing is done than in the prior art. Also, the conformance to a standard graphics API provides backward compatibility for allowing the user to continue using the pre-existing software. Moreover, the conformance to graphics API provides independence from the hardware implementation in graphics processor 210, so that the hardware can be changed without changing the software.

Initially, at the beginning of processing packets from CPU 204, synchronizer 213 optionally initializes (see act 251 in FIG. 2D) values that are specific to a frame (such as setting the address of frame buffer 232 or setting default values for depth clear). Depending on the implementation, synchronizer 213 also initializes all render state values to default values, e.g. by resetting a number of storage elements (not shown in FIG. 2A) that may be included in a current frame memory 216S. Note that act 251 is an optional act that is not performed in one embodiment (e.g. because such acts are performed by driver 220 (FIG. 2A) as described above) and in such an embodiment, synchronizer 213 starts with act 252.

In act 252 (see FIG. 2D), synchronizer 213 receives a packet (e.g. in the form of a render command), and checks (see act 253) whether the packet contains a primitive, and if not goes to act 254 and otherwise goes to act 256. In act 254, synchronizer 213 stores a switch command in broadcast buffer 236 (either unconditionally in one embodiment, or if the previous packet does not contain a render command in an alternative embodiment; note that depending on the implementation of the just-described alternative embodiment, synchronizer 213 may store a switch command in broadcast buffer 236 if the previous packet contains a render state). Next, in act 255, synchronizer 213 stores the received packet in broadcast buffer 236. Depending on the implementation, render states may also be stored in broadcast buffer 236 in act 255, or synchronizer 213 may conditionally store the received packet in buffer 236 only if the packet contains a command (e.g. as determined from type field 294 (FIG. 2B) in the received packet). Thereafter, synchronizer 213 returns to act 252.

In act 256, synchronizer 213 receives identities of tiles 201A–201P that are affected by the primitive in the received packet, and stores (see act 257) the switch command in at least one affected tile's buffer 231J (either unconditionally in one embodiment, or if the previous packet does not contain a primitive in an alternative embodiment). Note that in act 257, synchronizer 213 may store the switch command in the buffer of each tile that has been identified in act 256 as being affected by the received primitive. Depending on the implementation the switch command can be stored in buffers of all tiles (e.g. if a constant value is stored as the switch command, instead of a monotonically changing sequence number as described herein). Thereafter, synchronizer 213 associates (in act 258) with an affected tile 201J (FIG. 2A) the received primitive (or a part thereof that is relevant to the affected tile).

The association in act 258 can be performed by storing a set of vertices of the primitive (or a pointer to the vertices in an alternative embodiment) in a memory region 231J (FIG. 2D) in binning memory 231 (also called "tile buffer" 231J) that is reserved for holding such information for the identified tile 201J, for use by rendering pipeline 216). Such storage of graphics data allows binning engine 240 to operate on a frame (also called a "current frame") that is different from another frame (also called "previous frame") on which rendering pipeline 216 operates. The association in act 258 can be performed in an alternative embodiment by simply sending the received primitive (or a part thereof to one of a number of tile renderers that may be included in a rendering pipeline of the alternative embodiment (not shown). In such an alternative embodiment, the rendering pipeline and the binning engine can both operate on graphics data for the same frame. After act 258, synchronizer 213 goes to act 259 and checks if all tiles identified in act 256 have been processed, and if not returns to act 258 to continue the processing. If all tiles have been processed, synchronizer 213 returns to act 252 (described above) to process a packet that is being received.

Note that in one implementation, only primitives are stored in a tile buffer 231J. However, in another implementation of this embodiment (described below in reference to FIGS. 3A–3C), in addition to the primitive, one or more render states (provided by CPU 204 for use with the primitive) are also stored in tile buffer 231J. Note also that the determination of affected tiles can be integrated with the processing of packets, for example by replacing the act of receiving (see act 256 in FIG. 2D) with acts performed by geometry tiler 212 (as described in the related application [Attorney Docket Number M-6034] that was incorporated by reference above). Depending on the implementation, the tiles that are identified as being "affected" may include tiles that are not actually covered by the primitive, e.g. if a bounding box method is used to identify such tiles. Note further that the list of "affected" tiles may exclude tiles that are merely touched at a corner by the primitive, but are not actually covered. Numerous such modifications will be apparent to the skilled artisan in view of the disclosure.

In one embodiment, binning engine 240 stores all received packets of a frame in graphics memory 230 (either in broadcast buffer 236 or in tile buffers 23 1A–231P). In this embodiment, none of the packets are retrieved by retrieval engine 216 until after all packets for a frame are received and stored (and also until after one or more affected tiles have been identified (as illustrated by act 256) as being covered at least partially by each received primitive). Such storage of commands in broadcast buffer 236 that is common to all tiles is a significant aspect of this embodiment, because such storage eliminates redundant storage of the commands in every tile buffer.

Figure 2D:
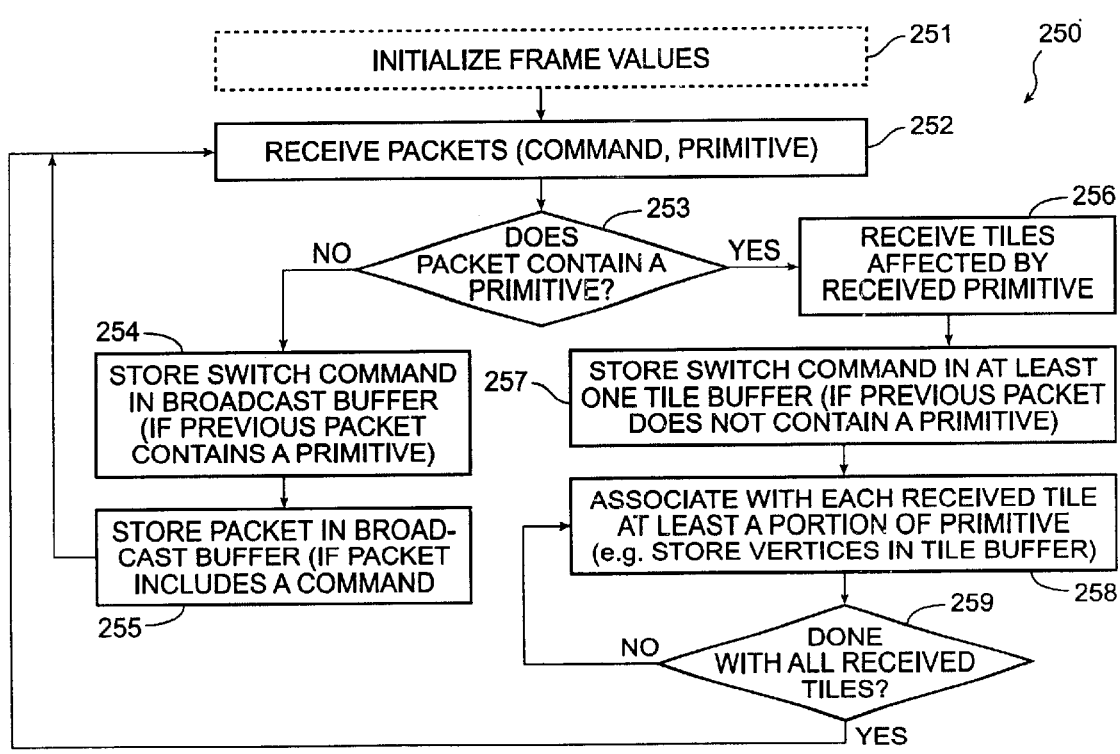
FIGS. 2D and 2E illustrate, in high-level flow charts, acts performed by a synchronizer and by a retrieval engine respectively that are included in the graphics processor illustrated in FIG. 2A.
Figure 2E:
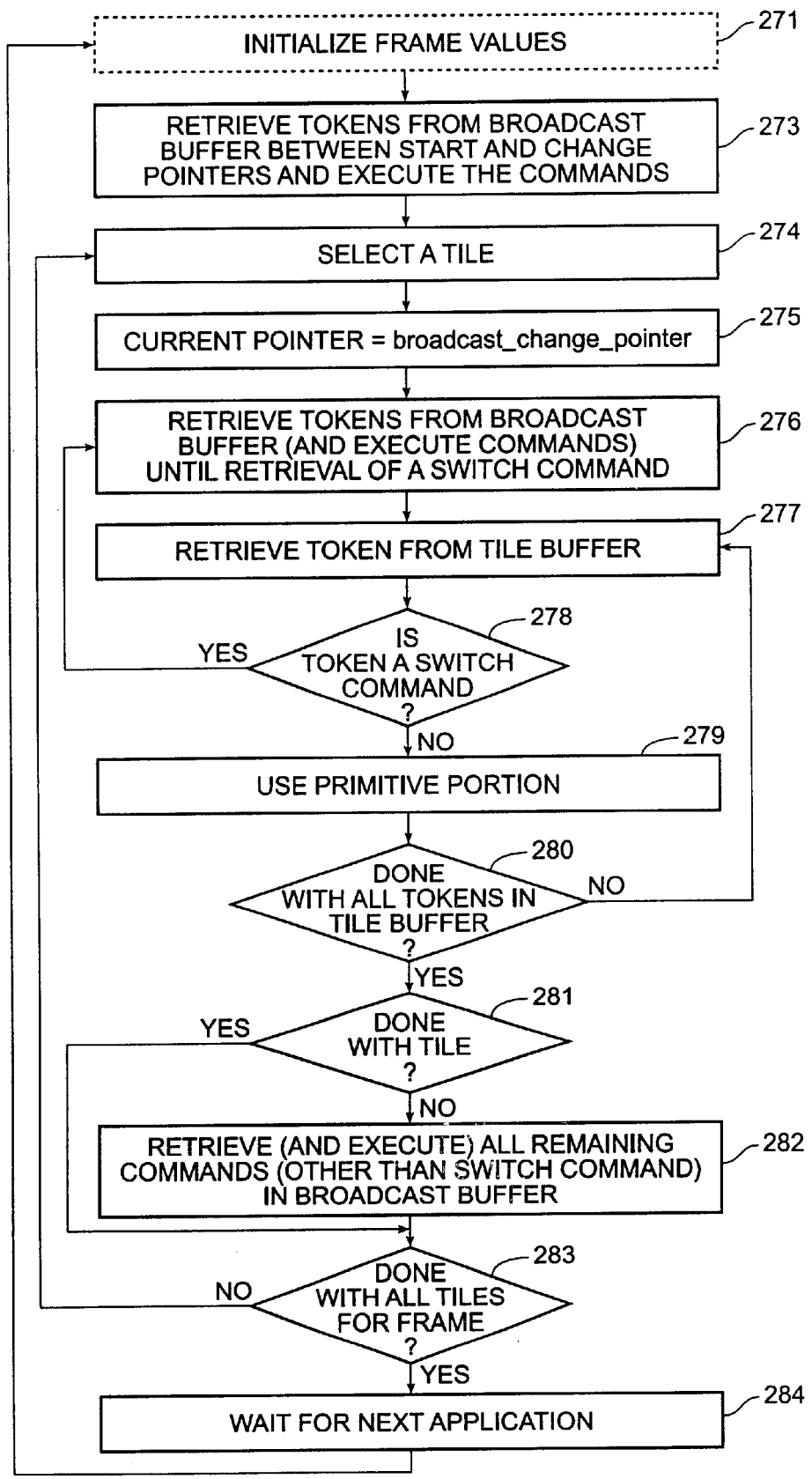

As noted above, at the end of a frame, one embodiment of driver 220 stores in act 226 (FIG. 2C) additional packets in broadcast buffer 236, and updates broadcast buffer pointers 214 (FIG. 2A) for use by retrieval engine 216E. Also as noted above, the graphics data (e.g. render commands, and primitives) in graphics memory 230 is merely stored therein, for processing by retrieval engine 216E (FIG. 2D). One embodiment of such a retrieval engine 216E performs the acts illustrated in FIG. 2E to process the data one tile at a time (or simultaneously in an alternative embodiment wherein retrieval engine 216E includes a number of tile renderers each of which is dedicated to rendering the graphics data for a single tile, the number being less than or equal to the number of tiles in screen 11 illustrated in FIG. 2A).

On start up, retrieval engine 216E initializes frame values (see act 271 in FIG. 2E), including for example how many tiles are included in the frame, and how many pixels are included in a tile. Note that act 271 is optional, and is not performed if act 221 (FIG. 2C) is performed by driver 220. If act 271 is not performed, retrieval engine 216E starts in act 273. In act 273 (FIG. 2E), retrieval engine 216E retrieves packets from region 291 (FIG. 2F) of broadcast buffer 236 (FIG. 2A) that is located between two pointers, namely the "broadcast start pointer" and the "broadcast change pointer" that are included in broadcast pointers 214 (FIG. 2A). Thereafter, rendering pipeline 216 executes commands in the retrieved packets.

As noted above, packets in region 285 were written by driver 220, and normally include one or more render command(s) that are to be processed for all tiles in screen 11 (FIG. 2A). Therefore, rendering pipeline 216 executes all the render commands included in the packets retrieved from region 285 (FIG. 2F). Also, depending on the implementation, in addition to render commands, packets retrieved from region 285 may include render state values, and if so, retrieval engine 216E updates the corresponding storage elements (not shown in FIG. 2A; see storage elements 316A–316R illustrated for one implementation in FIG. 3A) with the received state values. Therefore, rendering pipeline 216 processes all packets retrieved from region 285, i.e. does not distinguish between render states and render commands.

Next, in act 274 (FIG. 2E), retrieval engine 216E selects a tile 201J (e.g. sequentially selects, one at a time, all tiles in screen 11), and goes to act 275. In act 275, retrieval engine 216E sets a current pointer to be the same as the broadcast change pointer, thereby to start at the beginning of region 286 (FIG. 2F) in act 276. Specifically, in act 276, retrieval engine 216E retrieves one or more additional packets from region 286 (FIG. 2F), and executes one or more commands in the retrieved packets until a switch command is retrieved from region 286.

Note that in act 275, instead of setting the current pointer to the broadcast change pointer, the current pointer can be set to the broadcast start pointer in an embodiment that does not maintain a broadcast change pointer (e.g. if the number of packets between the broadcast start and broadcast change pointers is normally less than 10). Use of a broadcast change pointer can save significant time by avoiding redundant execution of packets between the two pointers, e.g. when the number of such packets is normally large (such as 50).

Thereafter, in act 277 (FIG. 2E), retrieval engine 216E retrieves a packet from tile buffer 231J. Retrieval engine 216E then checks (in act 278) if the token in the retrieved packet indicates a switch command, and if so, retrieval engine 216 returns to act 276 (described above) and otherwise goes to act 279. Note that on returning to act 276 from act 278, retrieval engine 216E continues to retrieve any remaining tokens before the end of broadcast buffer 236 (i.e. from a location indicated by the current pointer that is advanced after each such retrieval).

In act 279, retrieval engine 216E uses a primitive from the retrieved packet, e.g. to determine the color of each pixel in tile 201J on screen 11 (FIG. 2A). Next, retrieval engine 216E goes to act 280 to check if all packets have been retrieved from tile buffer 231J and if not returns to act 277 and otherwise goes to act 281. Retrieval engine 216E checks (in act 281) if all data for the tile selected in act 274 has been processed, e.g. checks that all packets in each of buffers 236 and 231J have been processed, and if so goes to act 282 and otherwise goes to act 283. In act 282, retrieval engine 216E executes all remaining commands (skipping any switch commands) in broadcast buffer 236. In act 283, retrieval engine 216E checks if all tiles in the frame have been processed, i.e. checks if act 274 has been performed for all tiles in screen 11 (FIG. 2A), and if so goes to act 284 to wait for next application, and otherwise returns to act 274. In act 284, after receipt of data from the next application, retrieval engine 216E returns to act 271.

Figure 3A:
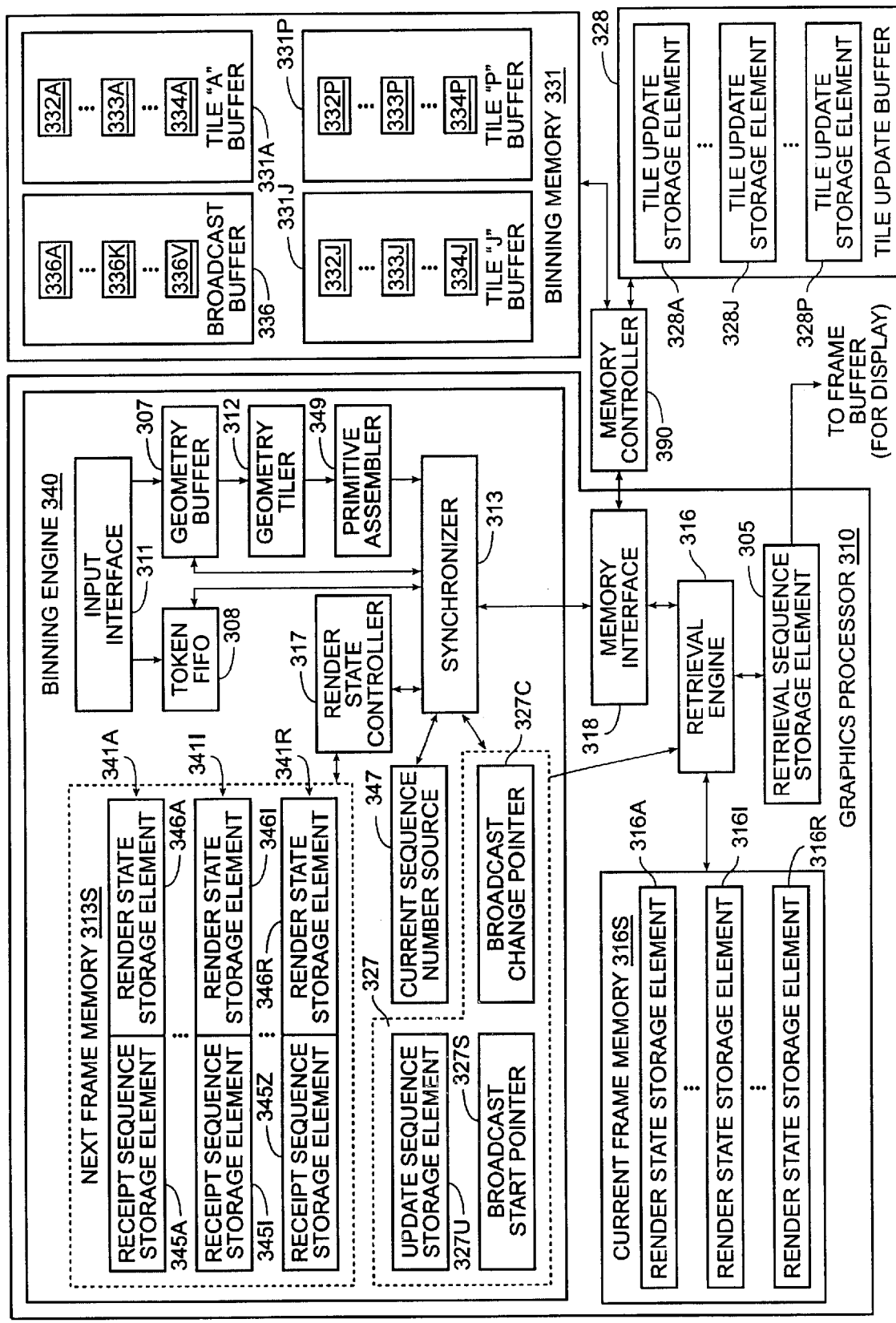
FIG. 3A illustrates, in an intermediate-level block diagram, circuitry included in the components of FIG. 2A in one embodiment of the invention.
Figure 3B:
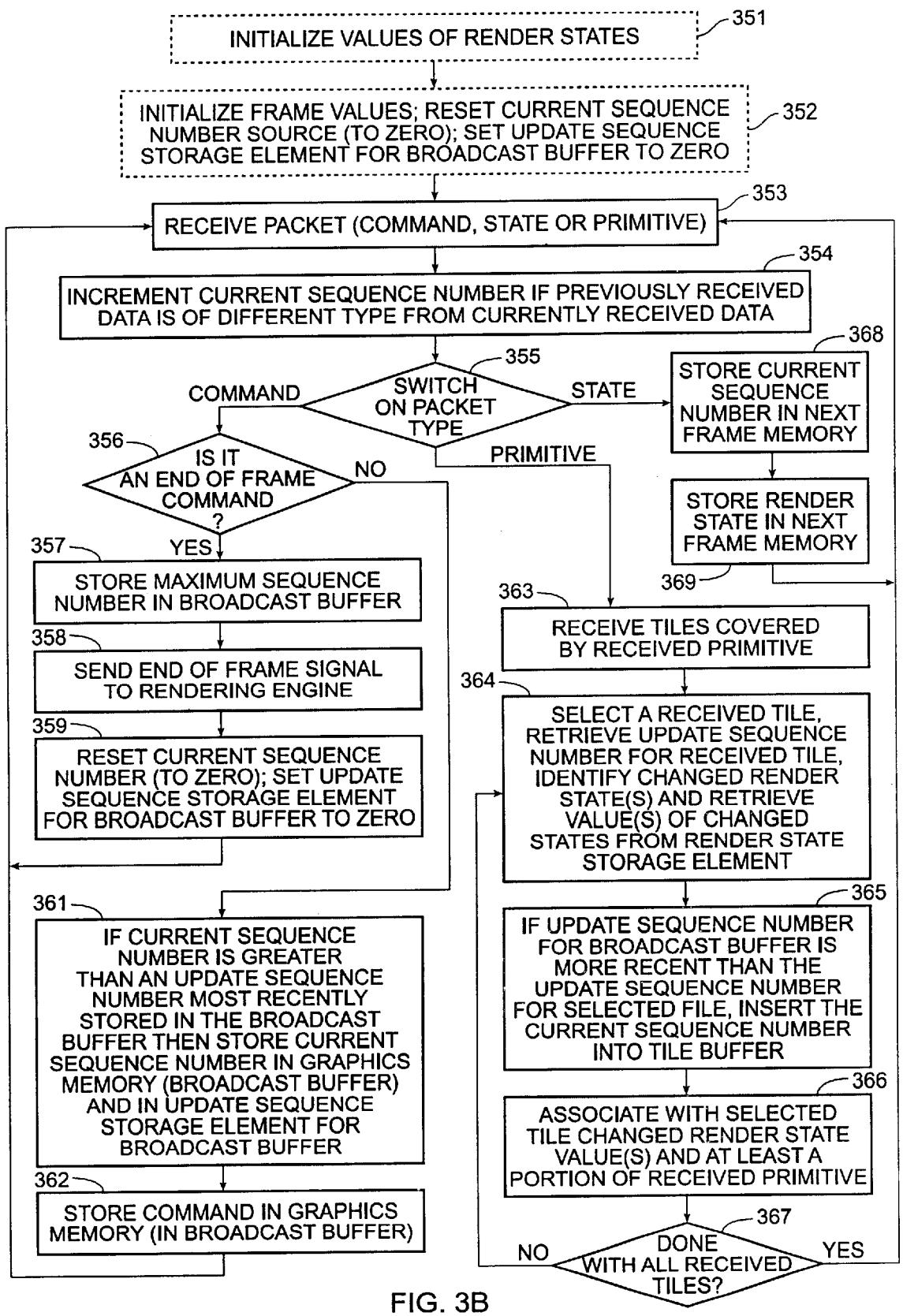
FIGS. 3B and 3C illustrate, in low-level flow charts, acts performed by a synchronizer and by a retrieval engine respectively that are included in the graphics processor illustrated in FIG. 3A.
Figure 3C:
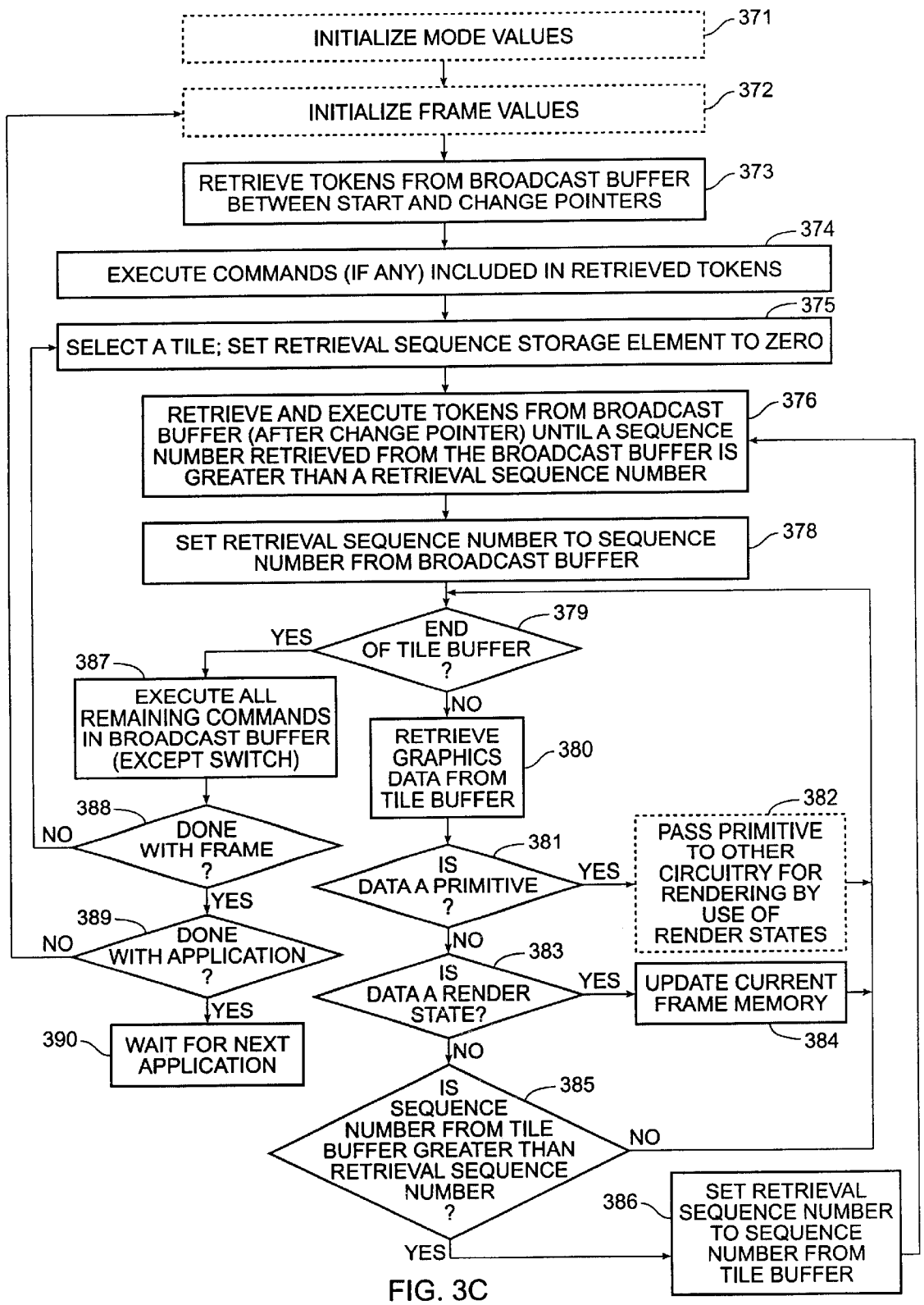

In one implementation of the just-described embodiment, a synchronizer 313 (FIG. 3A) implements "deferred render state binding" as described in U.S. patent application, Ser. No. 09/271,026 incorporated by reference above. Many of the reference numerals in FIGS. 3A–3C are derived from the corresponding reference numerals in FIGS. 2A–2F by adding 100. The corresponding reference numerals indicate portions of a circuit or acts in a method that are similar or identical to each other, except for certain differences that are noted below.

Binning engine 340 (FIG. 3A) of this implementation includes an on-chip memory (such as latches, registers, SRAM or DRAM) organized into a first memory 313S (also called "next-frame memory") in which are formed a number of storage units (hereinafter "state storage units") 341A–341R (wherein $A \leq I \leq R$, R being the total number of such storage units). Binning engine 340 is also coupled to another memory 328 (also called "tile update buffer") in which are formed a number of storage elements 328A–328P that are used to hold information about the last update to a tile.

In this implementation, memory interface 318 is coupled to binning memory 331 by a memory controller 390 that dynamically allocates portions of the memory (such as fixed size pages) for various buffers, such as broadcast buffer 336 and tile buffers 331A–331P. Memory controller 390 initially allocates a memory portion in response to a signal "open buffer" that is generated by binning engine 340 of this implementation. Thereafter, when an allocated memory portion for a buffer fills up, memory controller 390 automatically (without intervention by binning engine 340) allocates another memory portion for that buffer. Memory controller 390 stops the allocation of memory portions in response to a signal "close buffer" that is also generated by binning engine 340. Such dynamic allocation of memory portions to buffers 336 and 331A–331P eliminates wastage of memory that may otherwise be required when only a fixed amount of memory is allocated (only once) to each buffer, e.g. because the amount of memory required by the worst case scenario must be allocated for each tile buffer 331J.

In one embodiment, memory controller 390 manages accesses to binning memory 331 in a manner transparent to memory interface 318, so that binning memory 331 appears to be a large virtual memory with each new memory portion of a tile buffer 331J appearing sequentially after the previous memory portion in tile buffer 331J. Specifically, memory controller 390 uses a tile's identifier (also called signal "tile_id") provided by geometry tiler 312 (via assembler 349) as a predetermined number (e.g. 12 or 14) of high order bits of the virtual address. In this embodiment, memory controller 390 also stores a current sequence number in each tile update storage element 328J.

When buffers 331A–331P and 336 are closed by binning engine 340, all memory portions allocated to these buffers are henceforth used as a "rendering pool" by retrieval engine 316. When retrieval engine 316 completes usage of a memory portion (e.g. after a tile 331J has been rendered), the memory portion is dynamically reallocated by memory controller 390 for use by binning engine 340 for holding graphics data from another incoming frame. Note that memory controller 390 of this implementation also permits use of physical addresses to access storage locations in binning memory 331 (e.g. locations in broadcast buffer 336 that may be of a constant size), thereby to reduce processing time (otherwise spent in address translation).

In one example, tile update information (described above) includes an update sequence number that is a copy of the sequence number (hereinafter called "current sequence number") at the time that graphics data is associated with a tile, e.g. stored in a tile buffer 331J for a tile 201J. In another example, the tile update information includes values (hereinafter "previous values") of the render states most recently updated for each tile. Tile update buffer 328 can be located on-chip as illustrated in FIG. 3A, or can be located off-chip, in a separate memory device or included as part of binning memory 331.

Each render state storage element 346I holds the value of a render state. A first render state storage element 346A holds the value of a predetermined first render state (such as the texture state). In the example, the value of a texture state identifies the address of a texture to be used in generating pixel values for display on screen 11 (FIG. 2A). As another example, a second render state storage element 346I holds the value of a second state, such as a fog state, and such a value identifies whether or not fog is to be used in displaying the image.

In addition to render state storage elements 346A–346R, the respective state storage units 341A–341R can include additional storage elements as may be required, depending on the implementation. Examples of such additional storage elements are receipt sequence storage elements 345A–345R that hold copies of the current sequence number at the time of receipt of the corresponding render state value by graphics processor 310. Synchronizer 313 uses receipt sequence numbers held in a number of receipt sequence storage elements 345A–345R (FIG. 3A) that are included in binning engine 340 to identify (see act 360 in FIG. 3B) the render state values that have changed since the most recent update of render state values to that tile from among all render state values stored in next frame memory 313S (FIG. 3A).

In one implementation, the current sequence number is changed monotonically by a source 347 to indicate an order in which packets are being received. In one such example, current sequence number source 347 is a storage element that holds a number that is incremented (by synchronizer 313) each time graphics data is received by synchronizer 313, irrespective of the type of the graphics data (e.g. whether the data is primitive or render state). In another example, source 347 includes a clock circuit that periodically increments the current sequence number to indicate the elapsed time from the beginning of a frame.

In another implementation (see microfiche Appendix A), the current sequence number is incremented by a sequence source 347 only when a different type of data is received, i.e. the current sequence number remains the same as long as successive render states are being received. In this implementation, the current sequence number gets incremented (e.g. by a constant value, or by the elapsed time) when another render state is not received immediately prior to the currently received render state. Similarly, the current sequence number also gets incremented when another primitive is not received immediately prior to the currently received primitive. Note that instead of incrementing, the current sequence number can be decremented (thereby to have a monotonically decreasing sequence number). Therefore, the sequence number can be any number that is changed to represent the order in which graphics data is being received (e.g. can be gray coded).

In one embodiment, the current sequence number can also be updated by driver 220 issuing (e.g. in act 226 in FIG. 2C) a render command that contains a value (e.g. a predetermined value, such as the maximum value for a monotonically increasing sequence number) for the current sequence number. Specifically, in one implementation, driver 220 issues a render command containing the maximum value of the sequence number to indicate end of frame, and binning engine 340 writes the maximum value into broadcast buffer 336, and then also drives a signal indicative of the end of frame to retrieval engine 316. In an alternative embodiment, driver 220 issues just an end of frame command, and in response binning engine 340 writes the maximum value of sequence number into broadcast buffer 336, and then also drives a signal indicative of the end of frame to retrieval engine 316.

In this embodiment, driver 220 writes the default values into regions 285 and 286A only after receipt of all data for the frame, e.g. immediately prior to issuing the end of frame command (described above), so that only packets for render states that have changed are stored into regions 285 and 286 (because driver 220 determines which render states values have changed only at the end of the frame). In an alternative embodiment, driver 220 writes the default values into regions 285 and 286A at the beginning of a frame, e.g. writes the default values for all render states (because driver 220 does not know at that time as to which render states will change during the frame).

In one implementation, synchronizer 313 uses update sequence numbers that are stored in a number of update sequence storage elements 328A–328P (e.g. one element 328J for each tile 201J) included in tile-specific region 328 that in turn is included in a memory coupled to binning engine 340 (FIG. 3A). Note that tile buffer 331J has a number of storage elements 332J–334J that may be organized in a first-in-first-out (FIFO) manner, or as a queue. Broadcast buffer 336 is implemented in a RAM having storage elements 336A–336V that are accessed in order from broadcast buffer 336 (that may be implemented similar or identical to queue 236 as described above) once for each tile buffer 331J (from common change pointer to common end pointer in FIG. 2F). Note that for a given frame, the same broadcast buffer 336 is repeatedly accessed P times (once for each tile buffer 331J).

As noted above, synchronizer 313 performs acts 351–353 (FIG. 3B) that are similar or identical to the corresponding acts 251–253 (described above in reference to FIG. 2D). For example, in act 352 synchronizer 313 sets the address of frame buffer 232, sets default values for depth clear, and sets the number of tiles in a frame and the number of pixels in a tile. Note that in act 352, synchronizer 313 also resets the current sequence number source 347 to zero and also sets the update sequence storage element 327U (FIG. 3A) for the broadcast buffer to zero.

Next, in act 354, synchronizer 313 increments the current sequence number if the data in the previously received packet is of a different type from the data that is currently received. As an example, if the previously received data was a render command and if the data that was just received is a render state or a primitive, then the current sequence number is changed (e.g. incremented). If the just-received data is of the same type as the previously-received data, then synchronizer 313 does not change the current sequence number.

Next, in act 355, synchronizer 313 switches to one of three acts, depending on the type of data in the received packet. If the received packet is a command, synchronizer 313 goes to act 356. If the received packet is a primitive, synchronizer 313 goes to act 363. If the received packet is a state, synchronizer 313 goes to act 368.

In act 356, synchronizer 313 checks if the received command was an end of frame command, and if so goes to act 357 and otherwise goes to act 361. In act 357, synchronizer 313 stores a predetermined value (e.g. maximum value if monotonically increasing) for the current sequence number in broadcast buffer 336 (thereby to indicate an end of frame), sends (in act 358) the end of frame signal to retrieval engine 316, and resets (in act 359) the current sequence number source 347 (e.g. stores value 0 in a storage element that implements source 347). Thereafter, synchronizer 313 returns to act 353 (described above).

In act 361, synchronizer 313 stores in broadcast buffer 336 the value of the current sequence number if the value indicates a later time (e.g. if monotonically increasing, the value is greater) than another value that was most recently stored in broadcast buffer 336 (e.g. as indicated by update sequence storage element 327U (FIG. 3A) that is also updated at the same time). The conditional storage of the sequence number reduces the number of storage elements that are otherwise required to hold sequence numbers (e.g. one sequence number for each packet). Next, in act 362, synchronizer 313 stores the command in broadcast buffer 336 and returns to act 353.

In act 363, synchronizer 313 receives tiles that are covered by a received primitive, and goes to act 364. In act 364, synchronizer 313 selects a received tile, retrieves the update sequence number for the selected tile, and uses the update sequence number to identify the changed render states for the selected tile (e.g. based on comparison of sequence numbers held in next frame memory 313S with the update sequence number retrieved from tile update buffer 328 illustrated in FIG. 3A).

Synchronizer 313 also retrieves values of the changed render states (in act 364 illustrated in FIG. 3B) from the corresponding render state storage elements 346A–346R. Next, in act 365, synchronizer 313 inserts the current sequence number supplied by source 347 into broadcast buffer 336, only if the update sequence number for broadcast buffer 336 (held in storage element 327U) is more recent than the update sequence number for a selected tile 201J. Thereafter, synchronizer 313 associates (in act 366) the retrieved values with the selected tile. In addition, synchronizer 313 also associates one or more primitive portion(s) with the selected tile as described above (in reference to act 258 in FIG. 2D). Next, in act 367, synchronizer 313 checks if all tiles received in act 364 have been processed, and if not returns to act 364 and otherwise goes to act 353.

In act 368, synchronizer 313 stores the value of the current sequence number in next frame memory 313S (e.g. in receipt sequence storage element 341I), thereafter stores (in act 369) the render state in memory 313S (e.g. in render state storage element 346I), and returns to act 353 (described above). Note that one or more acts can be performed in an order reversed from the order described herein.

Retrieval engine 316 performs acts 371–389 (FIG. 3C) that are similar or identical to the corresponding acts 271–284 (described above), except that in this implementation, retrieval engine 316 uses the sequence numbers stored by synchronizer 313 in binning memory 331 (along with a render state and/or a render command). Specifically, retrieval engine 316 performs acts 371–373 in a manner similar or identical to acts 271–273, and thereafter goes to act 374. In act 374, retrieval engine 316 executes any commands that were included in the packets retrieved in act 373, and goes to act 375. In act 375 (FIG. 3C), retrieval engine 316 selects a tile (e.g. sequentially or pseudo-randomly) from among all tiles on screen 11), and also sets retrieval sequence storage element 305 to zero. Next, in act 376, retrieval engine 316 retrieves and executes additional packets from broadcast buffer 336 (after the broadcast change pointer illustrated in FIG. 2F), until a sequence number that is greater than an internal sequence number held in storage element 305 (FIG. 3A) is retrieved from buffer 336.

After execution of the retrieved commands, retrieval engine 316 goes to act 378 and uses the sequence number retrieved from buffer 336 to update internal sequence storage element 305 (FIG. 3A). Next, retrieval engine 316 goes to act 379 and checks if the end of the tile buffer was reached. If not, retrieval engine 316 goes to act 380 to retrieve data from a tile buffer 331J (that is dedicated to tile 201J illustrated in FIG. 2A). Next, in act 381, retrieval engine 316 checks if the retrieved data was a primitive and if so goes to act 382 to supply the primitive to other circuitry (not shown) in rendering pipeline 216, so that the primitive can be rendered using the render states in current frame memory 316S (FIG. 3A).

Note that act 382 is an optional act, and in an alternative embodiment, the primitive is supplied to other circuitry (not shown) in binning engine 340 for further binning. In the alternative embodiment, retrieval engine 216E is included in binning engine 240, and each tile 201J (FIG. 2A) is further subdivided into groups of pixels, each group of pixels forming a "subtile". The additional circuitry in such a binning engine performs binning of the graphics data retrieved from a tile buffer 231J into each of the subtiles (in a manner similar or identical to the binning of graphics data for a frame as described herein).

In act 381 if the retrieved data was not a primitive, retrieval engine 316 checks (in act 383) if the data was a render state, and if so goes to act 384 to update the retrieved value in current frame memory 316S, and otherwise goes to act 385. In act 385, retrieval engine 316 checks if the received sequence number is greater than the internal sequence number (held in storage element 305). If so, retrieval engine 316 goes to act 386 to update the sequence number and thereafter returns to act 376 (discussed above). If the condition checked in act 385 is false, retrieval engine 316 returns to act 379. Retrieval engine 316 also returns to act 379 when done with acts 382 and 384 (discussed above).

In act 379, if the end of tile buffer was reached, retrieval engine 316 goes to act 387 and executes all remaining commands in broadcast buffer 336 (except for any switch commands). Thereafter, retrieval engine 316 goes to act 388 to check if all data for the frame has been processed, and if not returns to act 375. If so, retrieval engine 316 goes to act 389 to check if all data for the application has been processed, and if not returns to act 372, and if so waits for data from the next application.

In one implementation, the flow charts illustrated in FIGS. 3B and 3C are implemented as described in the pseudo-code provided in microfiche Appendix A, wherein "render state" is referred to as "mode", "geometry buffer" is referred to as "vertex stack." In this implementation, binning engine 340 also includes a "render state controller 317" (FIG. 3A)

that maintains the information in next frame memory 313S in response to certain signals "set", "clear" and "search" that are supplied by synchronizer 313. Note that in other embodiments, render state controller 317 may be merged into synchronizer 313. In microfiche Appendix A "render state controller" is referred to as "mode controller." The following table indicates the locations in microfiche Appendix A at which various acts illustrated in FIGS. 3B and 3C are performed.

| Acts in FIGS. 3B and 3C | Microfiche Appendix A |
| --- | --- |
| 351, 352, 357, 358 | done by driver |
| 353 | page 23, upper third of page |
| 355 | page 23, half-way down the page |
| 361, 362 | page 25, middle of page |
| 368, 369 | page 23, middle of page |
| 354 | page 23, one-third down the page |
| 356 | page 25, top of page |
| 360 | page 23, bottom to page 24 |
| 363, 364 | page 24, middle of the page |
| 365, 366 | page 24, bottom half of the page |
| 367 | page 24, bottom of the page |
| 359 | page 25, upper third of the page |

Note that in the microfiche appendix, "render state" is referred to as "mode", "render command" is referred to as "command", "primitive bufer" is referred to as "vertex stack" and "render state controller" is referred to as "mode_control".

In one implementation, a current sequence number source 447 of the type described above in reference to FIG. 3A is included inside synchronizer 413. Current sequence number source 447 includes a time controller 450 that has an output port 450C for supplying a current sequence number that is based on the elapsed time from the beginning of a frame. Current sequence number source 447 also includes a register 442 having an input bus 442A coupled to output port 450C to receive therefrom the current sequence number, and an output port 442B that supplies the sequence number held in register 442.

Current sequence number source 447 further includes a first comparator 443 having a first comparator input bus 443A coupled to output port 450C, and a second comparator 444 having a second comparator input bus 444A coupled to tile update storage elements 438A–438P in graphics memory 430. Comparators 443 and 444 have the respective additional comparator input buses 443B and 444B that are both coupled to output port 442B of register 442. Comparators 443 and 444 also have output lines 443C and 444C respectively that are coupled to a control logic 420 included in synchronizer 413. Comparator 443 checks (in every clock cycle) if a sequence number (also called signal "command_time") held in register 442 is smaller than the current sequence number (also called signal "current_time") that is provided by time controller 450. If so, comparator 443 drives a signal "command_needs_time" active on output line 443C (that is coupled to control logic 420).

In response to signal "command_needs_time" going active, control logic 420 (that may be implemented as illustrated in microfiche Appendix A, starting at the bottom of page 22 and up to page 25) drives another signal active on an output line 422 to a multiplexer 441 if the packet being received at synchronizer input port 413T (that is coupled to multiplexer 441) does not contain the token "begin_primitive". In this implementation, the type of command (if present) in the packet received at synchronizer input port 413T is determined by a type controller 410 (also included in synchronizer 413) that is also coupled to receive the packet from port 413T, and provides a signal "type" (indicative of the presence/absence of "begin_primitive" token) to control logic 420.

Specifically, type controller 410 receives the packet and checks the type field to determine if the packet contains render state or render command. If the packet contains a render command, type controller 410 checks if the command is a begin primitive command. If so, type controller 410 provides the appropriate signal "type" to control logic 420. Type controller 410 also checks if the type of the packet that is currently received is different from the type of the most recently received packet, and if so, drives a signal "different_type" active to control logic 420.

In response to the control signal on line 422 going active, multiplexer 441 passes the signal "current_time" received on bus 441B (also called "alternative multiplexer input bus") to broadcast buffer 436, for storage therein (e.g. in a next element of the queue). As line 422 is also coupled to register 442, the signal stored therein is overwritten at this time by the signal "current_time". Next, control logic 420 changes the control signal to multiplexer 441 (e.g. by driving the signal on output line 422 inactive), and multiplexer 441 passes the signal on bus (also called "first multiplexer input bus") 441A from port 413T (that is coupled to token buffer 308 as illustrated in FIG. 3A) to broadcast buffer 436, thereby to store the received packet. If the packet received at port 413T contains a "begin primitive" command, control logic 420 receives from port 413G (that is coupled to geometry buffer 307 via primitive assembler 349) a tile identifier (e.g. signal "tile_id" on bus 424), and vertices of the primitive that covers the tile indicated by the tile identifier. Thereafter, control logic 420 sends a control signal via bus 425 to memory controller 390 to open a tile buffer 431J (for a tile 201J identified by primitive assembler 349 illustrated in FIG. 3A).

Comparator 444 receives on bus 444A an update sequence number from a tile update buffer 438J for a tile 201J that is identified by a signal "tile_id" received on bus 424 at port 413G (e.g. from primitive assembler 349, or directly from geometry tiler 312 if assembler 349 is not implemented). As noted above, in this implementation, the time is used as a sequence number. Therefore, if an update sequence number on bus 444A is less than the sequence number in register 442 (received via bus 444B) controller 444 generates a signal "tile_needs_time" on a line 444C that is coupled to control logic 420. In response to signal "tile_needs_time" control logic 420 operates multiplexer 445 (by driving a signal on line 423).

In response to the active signal from control logic 420, multiplexer 445 passes the signal "current_time" on bus (also called "alternative multiplexer input bus") 445B from time controller 450 (via an output buffer 446 that enables burst writes to memory 430) to an appropriate tile buffer 431J. Thereafter, control logic 420 changes the control signal to multiplexer 445, thereby to cause multiplexer 445 to pass to tile buffer 431J the signals (indicative of vertices) on bus (also called "second multiplexer input bus") 445A that were received at port 413G. Note that prior to such storage of vertices in a buffer 431J, all values in render state storage elements 346A–346R (FIG. 3A) are stored in buffer 431J, and the signal in tile update storage element 438J is updated. When control logic 420 receives an "end_primitive" command on bus 424 (instead of a tile identity), control logic 420 switches back to processing of packets being received at port 413T (as described above in reference to circuits 443, 442, 450 and 410).

Figure 4A:
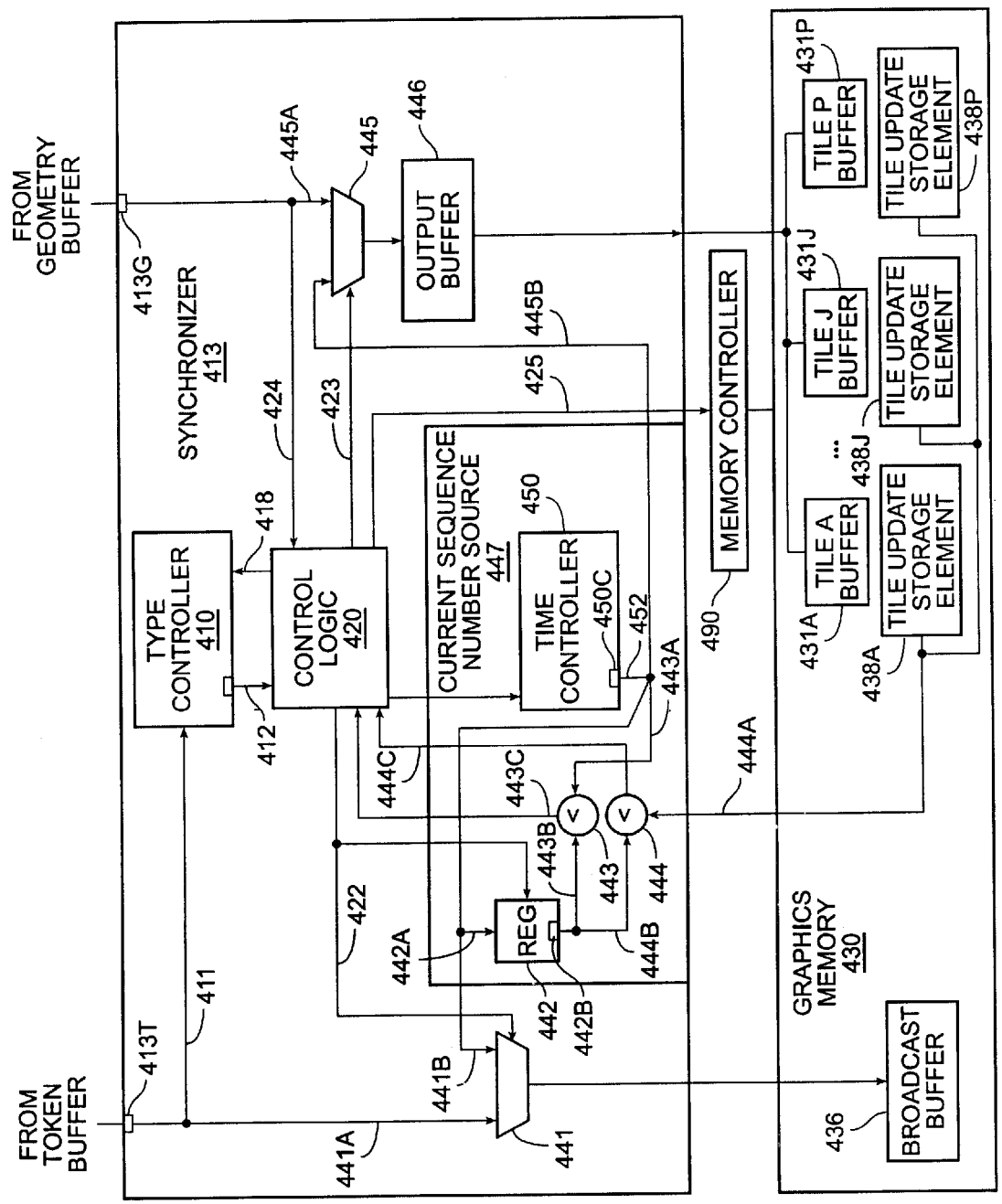
FIGS. 4A–4C illustrate, in low-level block diagrams, circuitry used in one implementation of the components of FIG. 3A.
Figure 4B:
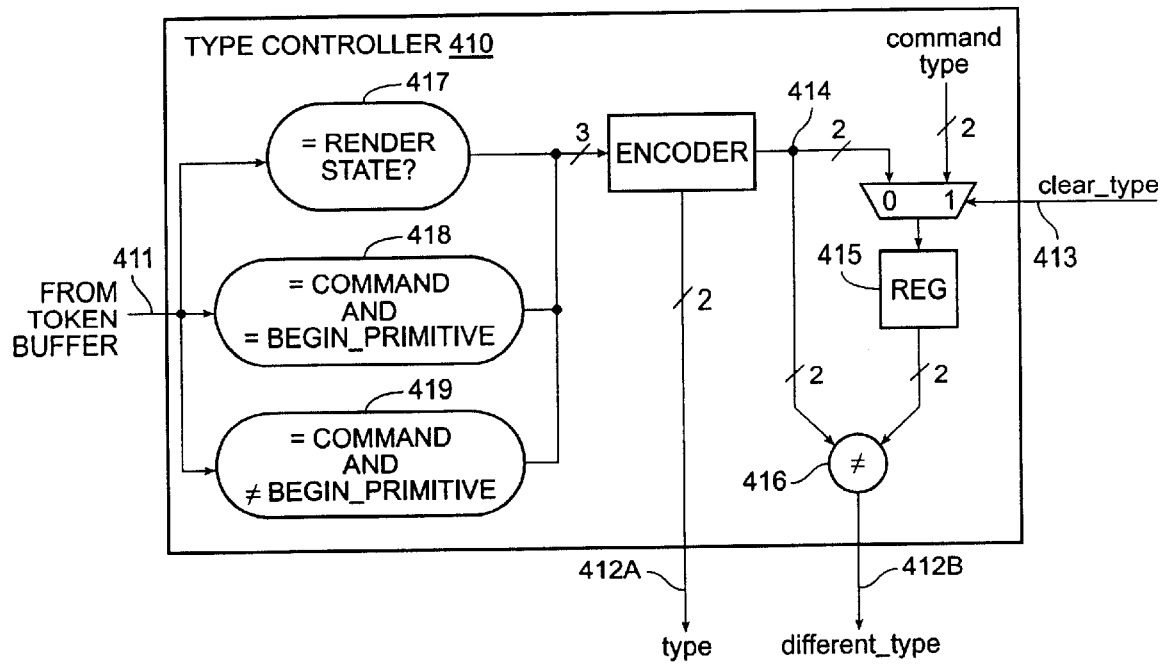

In one embodiment, type controller 410 (FIG. 4B) includes comparators 417–419. Comparator 417 compares the signal in type field 294 (FIG. 2B) with a predetermined constant (e.g. 1) to determine that a render state is included in the packet received on bus 411 (that is coupled to input port 313T as illustrated in FIG. 4A), and drives active a signal "render state" on bus 412A (e.g. a 3 bit bus carrying a signal from each of comparators 417–419). Comparator 418 compares the signal in type field 294 (FIG. 2B) with another predetermined constant (e.g. 0) to determine that a render command is included in the packet received on bus 411. Comparator 418 also compares the signal in token field 295 with still another constant (e.g. 33), to determine that the command being received is a "begin primitive" command. If both conditions are met, comparator 418 drives active a signal "begin_primitive" on bus 412A. Comparator 419 is similar to comparator 418 (described above), except that comparator 419 drives active a signal "command_type" on bus 412A if the packet on bus 411 contains a command, but the command is not the "begin primitive" command.

Type controller 410 also includes a comparator 416 that compares the type signal on bus 412 (received via node 414) with a previous type signal that is held in register 415, and in case of no match drives signal different_type on line 412B active. If there is a match, comparator 416 drives signal different_type_on line 412B inactive. An encoder (not labeled) encodes the three bits of the type signal on bus 412A to supply a 2 bit signal to node 414. Type controller 410 also includes a multiplexer (not labeled) that normally stores the type signal at node 414 in register 415 for use in the next cycle. Multiplexer stores the signal "command_type" in register 415 in response to an active signal "clear_type" received on line 413 from control logic 420 (FIG. 4A).

Figure 4C:
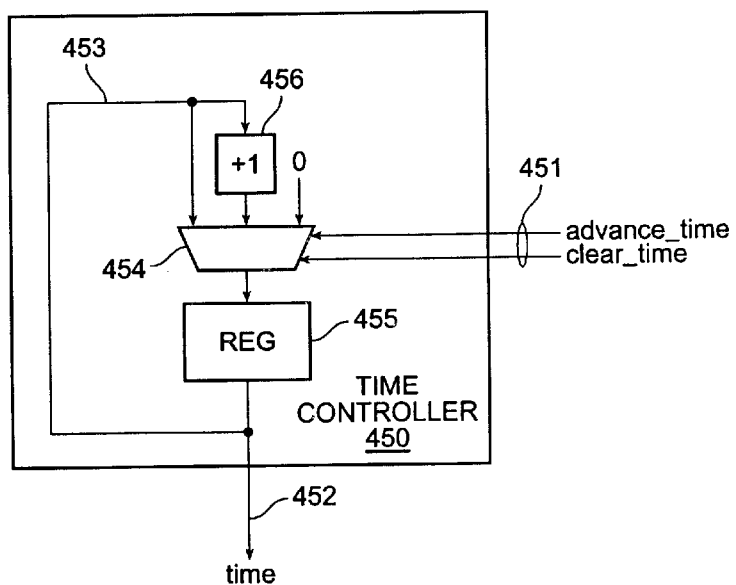

Time controller 450 (FIG. 4C) of this implementation includes a multiplexer 454 that stores a previous time signal carried by bus 452 into a register 455, unless one of control signals advance_time and clear_time received on bus 451 is active. Signal advance_time is normally driven active by control logic 420 (FIG. 4A) when another signal different_type that is generated by type controller 410 is active. In response to the signal advance_time going active, multiplexer 454 (FIG. 4C) passes an incremented time signal (provided by incrementer 456 that is included in time controller 450) to register 455 (also included in controller 450). Incrementer 456 receives a previous time signal from register 455 via bus 453. Moreover, in response to the signal clear_time going active, multiplexer 451 passes a signal of value 0 to register 455, thereby to reset register 455. When neither of control signals advance_time and clear_time are active, multiplexer 454 simply passes the signal from bus 453 to register 455 (thereby to maintain the update sequence number constant).

Figure 4D:
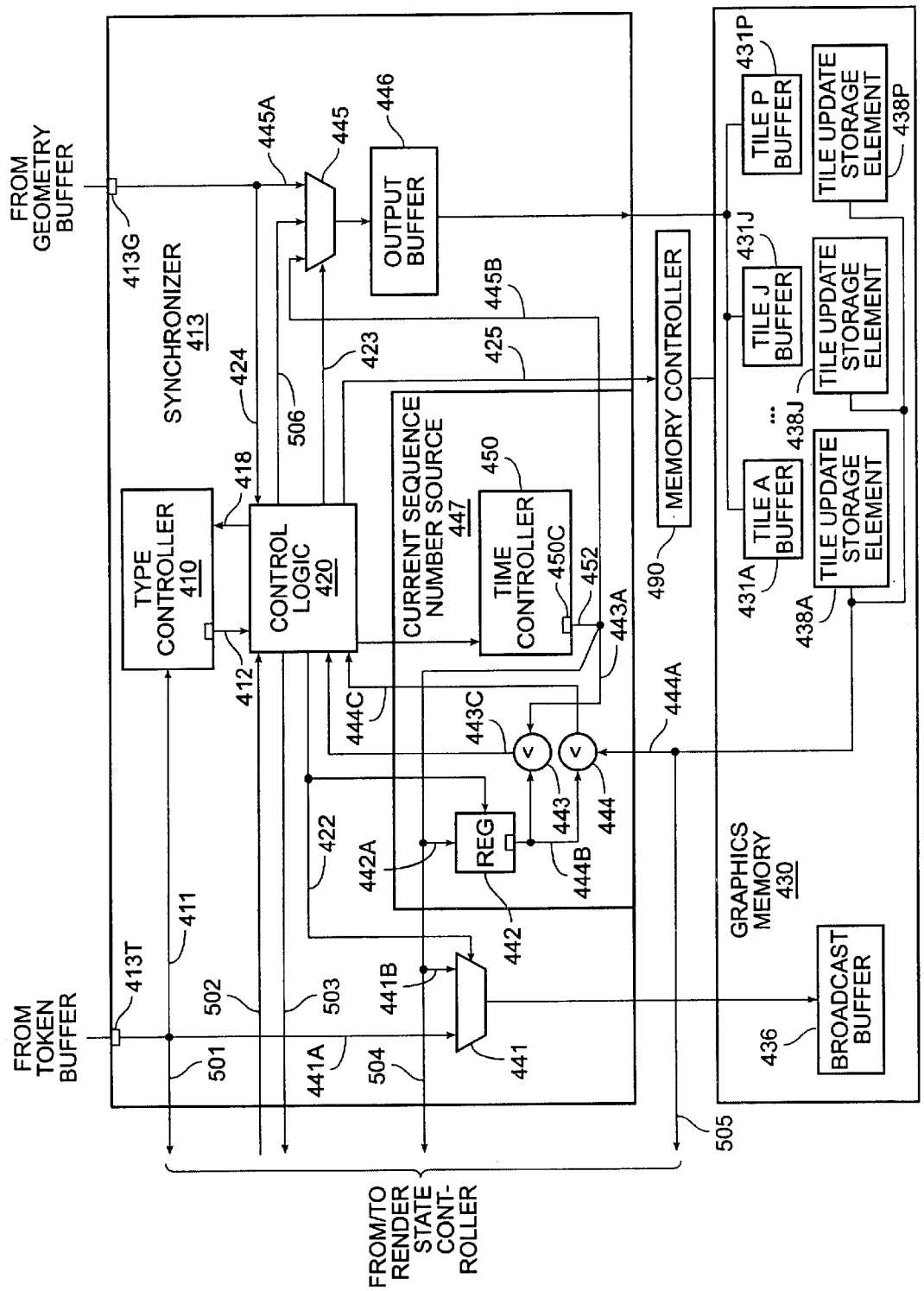
FIG. 4D illustrates lines added to the circuitry in FIG. 4A for use with a render state controller of the type illustrated in FIG. 3A.

In one embodiment, synchronizer 413 has additional lines 501–506 (FIG. 4D) that carry signals for the processing of render states by a render state controller (such as controller 317 illustrated in FIG. 3A) that is described in U.S. patent application, Ser. No. 09/271,026 incorporated by reference above. Specifically, lines 501 receive from port 413T the signals "write_value" and "write_id," lines 502 pass to control logic 420 the signals "render_data", "search_done", and "render_state_valid", lines 503 receive from control logic 420 the signals "clear", "set" and "search", lines 504 receive from port 450C the signal "write_time", and lines 505 receive from a tile update storage element 438J in graphics memory 430 the signal "search_time".

In addition, lines 506 receive from control logic 420 the signal "render_data" (that was provided by lines 502) and pass the signal to multiplexer 445 (that is a three input multiplexer in this embodiment). Control logic 420 operates multiplexer 445 to pass the signal "render_data" (that contains values of render states) between the storage of current_time and the vertices, so that each tile buffer 431J contains all necessary information for the rendering of pixels in the corresponding tile 201J (FIG. 2A).

In the description, several embodiments, variants, and implementations of a synchronizer and a retrieval engine are described by reference to various specific elements and combinations thereof, although such elements and combinations are not essential to practicing the invention. Specifically, numerous modifications and adaptations of the above-described embodiments will be apparent to a person of skill in the art of designing digital circuits in view of the disclosure.

For example, another implementation can be obtained by combining two aspects of the above described embodiments wherein some render states (such as fog) that are common to an entire frame are stored in broadcast buffer 336, and other render states (such as texture) are maintained in tile buffers 331A–331P. In another example, some render commands (such as clear) that are specific to processing a tile are stored in a tile buffer 331J, and other render commands that are common to an entire frame (such as setting the address of frame buffer 235 illustrated in FIG. 2A) are stored in broadcast buffer 336.

As another example, any method, such as a bounding box method or a precise method can be used to identify tiles affected by a graphics primitive. In the bounding box method, a rectangle (called "bounding box") that touches the vertices of a triangle to be binned is drawn, and all tiles within such a bounding box are identified as being the tiles affected by the primitive. Bounding boxes (also called "extent" boxes) are described in Computer Graphics, Principles and Practice, Second Edition in C, Foley, van Dam, Feiner and Hughes, Addison-Wesley Publishing Company, 1990 (see pages 660–663 and 336–337 that are incorporated by reference herein in their entirety).

An example of the precise method is described in the U.S. patent application, Ser. No. 09/271,637 that was incorporated by reference above. An example of an approximate method that uses the edges of the graphics primitive to determine a number of bounding boxes that in turn are used to identify covered tiles is also described in the just-described U.S. Patent Application.

As yet another example, in one embodiment the rendering pipeline operates on one tile at a time, e.g. by receiving a render command from the broadcast buffer, and receiving the primitive portion from the tile buffer for a specific tile, and repeating the acts of retrieving and receiving for all remaining tiles. In an alternative embodiment, the rendering pipeline includes a number of tile renderers that operate simultaneously on a corresponding number of tiles (e.g. may operate simultaneously on all tiles in the screen). In the alternative embodiment, each tile renderer receives the same render command from the broadcast buffer, but receives a different primitive portion from the tile buffer for a specific tile on which the tile renderer operates. Moreover, such a tile renderer skips acts 375 and 388 (described above). Also, data for a group of tiles (but not all tiles) in a screen may be processed by a single renderer (an example of such a single renderer may process data for all tiles in a column, or alternatively data for all tiles in a row).

In yet another embodiment, deferred render state binding is not performed, and instead, all the packets (including primitives, render commands and changed render state values) are written in the order received into the broadcast buffer (without writing any sequence numbers into the broadcast buffer or the tile buffers) and the packets are processed in the order received. Therefore, in this embodiment, the render state values are not associated with any individual tile, and the rendering pipeline processes all render state values for each tile.

In a first variant of the just-described embodiment, not all the packets are written into the broadcast buffer, and instead only packets having render commands, render states and certain large primitives (defined to be primitives that cover a predetermined percentage of screen 11, e.g. 30% or 50%) are written into the broadcast buffer. Although in the first variant all packets containing render states are written into the broadcast buffer, only packets having certain predetermined render states can be inserted into the broadcast buffer. In the first variant, in addition to the packets, sequence numbers are written into each of the broadcast buffer, and appropriate tile buffers to allow the rendering pipeline to synchronize with other primitives that are written into the tile buffers as described above. In a second variant, not all the packets are written into the broadcast buffer, and instead only packets having render commands, and render states are written into the broadcast buffer. In this variant as well, sequence numbers are written into each of the broadcast buffer, and appropriate tile buffers to allow the rendering pipeline to synchronize with primitives that are written into the tile buffers.

Various such modifications and adaptations are encompassed by the attached claims.

What is claimed is:

1. A method for storing a render command and a primitive that affects a plurality of tiles in a screen, the method comprising:

receiving the render command;

storing the render command in a broadcast buffer for later processing of received commands repetitively in connection with the plurality of tiles;

receiving the primitive; and storing at least a portion of the primitive in a tile buffer corresponding to each tile in the plurality of tiles, the tile buffer being separate and distinct from the broadcast buffer.

2. The method of claim 1 further comprising:

receiving a plurality of additional render commands and a plurality of additional primitives;

storing each additional render command in the broadcast buffer; and storing at least a portion of each additional primitive in the tile buffer of each tile in the screen affected by the additional primitive.

3. The method of claim 1 further comprising:

storing a switch command in the broadcast buffer on storage of the render command in the broadcast buffer; and storing the switch command in the tile buffer on storage of the portion of the primitive in the tile buffer.

4. The method of claim 3 wherein:

graphics data is received prior to said "receiving the render command";

said "storing a switch command in the broadcast buffer" is performed only if the graphics data is not another render command.

5. The method of claim 3 wherein:

graphics data is received prior to said "receiving the primitive"; and said "storing the switch command in the tile buffer" is performed only if the graphics data is not another primitive.

6. The method of claim 3 wherein the switch command includes a current sequence number, the method further comprising:

changing the current sequence number monotonically subsequent to at least one of said "receiving the render command" and said "receiving the primitive".

7. The method of claim 6 wherein:

graphics data is received prior to said "receiving the render command";

said "changing the current sequence number" is performed only if the graphics data is not another render command.

8. The method of claim 6 wherein:

graphics data is received prior to said "receiving the primitive";

said "changing the current sequence number" is performed only if the graphics data is not another primitive.

9. The method of claim 6 wherein:

the current sequence number is based on time elapsed relative to the beginning of a frame.

10. The method of claim 6 further comprising:

storing the current sequence number in an update sequence storage element for the broadcast buffer, on storage of the render command in the broadcast buffer.

11. The method of claim 10 wherein each of:

said "storing the current sequence number in an update sequence storage element for the broadcast buffer" and said "storing a switch command in the broadcast buffer", are performed only if the current sequence number is greater than another sequence number retrieved from the update sequence storage element for the broadcast buffer.

12. The method of claim 3 further comprising:

storing the current sequence number in an update sequence storage element for the tile buffer, on storage of the portion of the primitive in the tile buffer.

13. The method of claim 12 wherein:

said "storing the current sequence number in an update sequence storage element for the tile buffer" and said "storing the switch command in the tile buffer", are performed only if the current sequence number is greater than another sequence number retrieved from the update sequence storage element for the tile buffer.

14. The method of claim 3 further comprising:

retrieving graphics data including the render command from the broadcast buffer until receipt of a first switch command or until end of the broadcast buffer;

in response to the first switch command retrieving graphics data including the portion of the primitive from the tile buffer until receipt of a second switch command or end of the tile buffer; and returning to said "retrieving graphics data."

15. A circuit for storing render commands and primitives, the circuit comprising:

a graphics memory including a plurality of tile buffers, each tile buffer corresponding to one of a plurality of tiles in a screen, and a separate and distinct broadcast buffer for storing commands for later repetitive processing in connection with the plurality of tiles; and a synchronizer coupled to the graphics memory, wherein the synchronizer has a first input port for receipt of render commands and a second input port for receipt of primitives and identities of tiles affected by the primitives, the synchronizer including:

a first multiplexer having a first multiplexer input bus coupled to first input port, and a second multiplexer having a second multiplexer input bus coupled to the second input port, each of the first multiplexer and the second multiplexer having an alternative multiplexer input bus that carries a current sequence number, the first multiplexer being coupled to the broad buffer and the second multiplexer being coupled to each tile buffer in the plurality; and a control logic having a first control line coupled to the first multiplexer and a second control line coupled to the second multiplexer;

wherein the control logic changes a first signal on the first control to operate the first multiplexer to pass a render command and the current sequence number received at each of the first multiplexer input bus and the alternative multiplexer input bus of the first multiplexer to the broadcast buffer on receipt of the render command at the first input port, and the control logic changes a second signal on the second control line to operate the second multiplexer to pass a primitive and the current sequence number received each of the second multiplexer input bus and the alternative multiplexer input bus of the second multiplexer to a tile buffer on receipt of the primitive at second input port.

16. The circuit of claim 15 further comprising a current sequence number source having:

a time controller having a sequence output port coupled to the alternative input bus of each of the first multiplexer and the second multiplexer; and a register having an input bus coupled to the sequence output port and a control line coupled to the first control line.

17. The circuit of claim 16 wherein the current sequence number source further includes:

a first comparator having a first comparator input bus coupled to the sequence output port, and a second comparator having a second comparator input bus coupled to the sequence output port, each of the first comparator and the second comparator having an additional comparator input bus coupled to an output port of the register, each of the first comparator and the second comparator having an output line coupled to the control logic.

18. The circuit of claim 15 further comprising:

a type controller having an input bus coupled to the first input port and an output port coupled to the control logic;

wherein the type controller compares a portion of an input signal on the input bus to at least a predetermined pattern of bits and generates on the output port a signal indicative of at least a result of said comparison.

19. In a tile-based graphics system, a method for processing a sequence of data packets, the method comprising the steps of:

(a) receiving a current packet in the sequence of data packets, the current packet containing at least one of a render command and a primitive affecting a plurality of tiles in a display;

(b) performing the following acts when the current packet contains a render command:
(i) storing a switch command in a broadcast buffer containing data for later repetitive processing, when a most recent previous packet in the sequence of data packets contained a primitive; and
(ii) storing the render command in the broadcast buffer; and (c) performing the following acts when the current packet contains a primitive:
(i) selecting one of a plurality of tile buffers, each tile buffer corresponding to a respective one of the plurality of tiles affected by the primitive;
(ii) storing a switch command in the selected tile buffer when the most recent previous packet did not include a primitive;
(iii) storing at least a portion of the primitive in the tile buffer;
(iv) selecting a different one of the plurality of tile buffers; and
(v) repeating steps (i)–(iv) until each of the plurality of tile buffers has been selected.

20. The method of claim 19, wherein the switch command comprises a sequence number.

21. The method of claim 19, further comprising the steps of:

(d) selecting one of the plurality of tile buffers for processing;

(e) retrieving data sequentially from the broadcast buffer until a first switch command is retrieved;

(f) retrieving data sequentially from the selected one of the plurality of tile buffers until a second switch command is received; and (g) repeating steps (e) and (f) until all data in the broadcast buffer and the selected one of the plurality of tile buffers has been retrieved.

22. The method of claim 21, further comprising the steps of:

(h) selecting a different one of the plurality of tile buffers; and (i) repeating steps (d)–(g).

23. The method of claim 22, further comprising the steps of:

(j) executing a retrieved render command; and (k) during execution of the retrieved render command, using retrieved primitive data to generate pixel values for display on a screen.

24. A tile-based graphics data processing system comprising:

an input interface configured to receive graphics data including render commands and primitive data;

a graphics memory comprising:
a broadcast buffer configured to store received render commands for repetitive processing in connection with a plurality of tiles; and
a plurality of tile buffers configured to store received primitive data, each tile buffer corresponding to a respective one of the plurality of tiles; and a graphics processor coupled to the input interface and the graphics memory, and configured to receive graphics data via the input interface, storing received render commands in the broadcast buffer, and storing at least part of the received primitive data in one or more of the plurality of tile buffers.

25. The system of claim 24, wherein the graphics processor comprises:

a binning engine configured to identify render commands and primitives in the graphics data and to store the identified render commands and primitives in the broadcast buffer and tile buffers of the graphics memory, respectively, the binning engine further configured to store first switch commands in the broadcast buffer and second switch commands in the tile buffers;

a retrieval engine configured to sequentially retrieve render commands and first switch commands from the broadcast buffer and primitive data and second switch commands from the plurality of tile buffers, the sequence of retrieval being controlled by the retrieved first and second switch commands; and a rendering pipeline configured to execute render commands retrieved by the retrieval engine in conjunction with primitive data retrieved by the retrieval engine.

26. The system of claim 25, wherein the binning engine comprises:

a synchronizer input port configured to receive packets containing graphics data from the input interface;

a type controller coupled to the synchronizer input port and configured to identify a current data type of a current packet of received graphics data and further configured to determine whether the current data type is different from a previous data type of a previously received packet;

a current sequence number source configured to generate and update a current sequence number;

control logic coupled to the type controller and the current sequence number source, the control logic configured to generate first and second control signals;

a first output controller coupled to the control logic, the synchronizer input port, the current sequence number source, and the buffer memory, the first output controller being configured to store in the buffer memory at least one of the current packet and a control signal comprising the current sequence number, in response to the first control signal, and a second output controller coupled to the control logic, the synchronizer input port, the current sequence number source, and the plurality of tile buffers, the second output controller being configured to store in one or more of the plurality of tile buffers at least one of a part of the current packet and a control signal comprising the current sequence number, in response to the second control signal.

27. The system of claim 26, wherein the current sequence number source comprises:

a time controller configured to generate and update a current time index and to provide the current time index as a current sequence number to the first and second output controllers;

a register coupled to the time controller and configured to store a previous time index;

a comparator coupled to receive the current time index from the time controller and the previous time index from the register, the comparator being configured to transmit an update signal to the control logic when the current time index is different from the previous time index.

* * * * *